United States Patent
Zhu et al.

(10) Patent No.: US 8,655,174 B2
(45) Date of Patent: Feb. 18, 2014

(54) WAVELENGTH DIVISION MULTIPLEXER COMPATIBLE WITH TWO TYPES OF PASSIVE OPTICAL NETWORKS

(75) Inventors: Songlin Zhu, Guangdong Province (CN); Dan Geng, Guangdong Province (CN); Jie Su, Guangdong Province (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 78 days.

(21) Appl. No.: 13/257,991

(22) PCT Filed: Sep. 24, 2009

(86) PCT No.: PCT/CN2009/074200
§ 371 (c)(1),
(2), (4) Date: Oct. 18, 2011

(87) PCT Pub. No.: WO2010/121463
PCT Pub. Date: Oct. 28, 2010

(65) Prior Publication Data
US 2012/0039605 A1     Feb. 16, 2012

(30) Foreign Application Priority Data

Apr. 21, 2009  (CN) .......................... 2009 1 0135534

(51) Int. Cl.
*H04J 14/00*     (2006.01)
(52) U.S. Cl.
USPC ............... 398/72; 398/71; 398/74; 398/75; 398/79; 398/100; 370/352; 370/389; 370/392; 370/468; 385/24; 385/37
(58) Field of Classification Search
USPC .......... 398/66, 67, 68, 69, 70, 71, 72, 58, 75, 398/76, 77, 78, 79, 74, 82, 84, 85, 87, 98, 398/99, 100; 370/352, 389, 392, 468; 370/395.51; 385/24, 37, 15
See application file for complete search history.

(56) References Cited

U.S. PATENT DOCUMENTS

| 7,773,838 B2 * | 8/2010 | Lee et al. ................ 385/24 |
| 8,005,361 B2 * | 8/2011 | Nakaishi et al. ......... 398/67 |
| 2009/0202246 A1 * | 8/2009 | Kashima ................ 398/77 |

FOREIGN PATENT DOCUMENTS

| CN | 1845485 A | 10/2006 |
| CN | 101098206 A | 1/2008 |
| CN | 101237293 A | 8/2008 |
| WO | 2008054045 A1 | 5/2008 |
| WO | 2008056843 A1 | 5/2008 |

(Continued)

OTHER PUBLICATIONS

International Search Report for PCT/CN2009/074200 dated Jan. 19, 2010.

(Continued)

*Primary Examiner* — Hanh Phan
(74) *Attorney, Agent, or Firm* — Ling Wu; Stephen Yang; Ling and Yang Intellectual Property

(57) ABSTRACT

A wavelength division multiplexer is provided by the present invention, which implements the wavelength division multiplexing and de-multiplexing of the optical signals in the basic and upgrade bands by reasonably arranging the filters and selecting the spectral properties of the filters, so that the existing time division multiplexing passive optical network (TDM-PON) can transmit the next generation passive optical network (NG-PON) simultaneously and the existing TDM-PON can be smoothly upgraded to the NG-PON, meanwhile, it provides the deployed TDM-PON with the subsequent network compatibility. The wavelength division multiplexer provided in the present invention can meet the high isolation requirement of the optical signals in working band with low cost, and takes both the isolation requirement and the optical network insertion loss requirement into account, thus it has high reliability, is easy to use and for system upgrade.

18 Claims, 12 Drawing Sheets

(56) References Cited

FOREIGN PATENT DOCUMENTS

WO   2008056876  A1   5/2008

OTHER PUBLICATIONS

Ki-Man Choi et al. XP31391137A,"An Efficient Evolution Method from a TDM-PON with a Video Overlay to NGA", Department of Electrical Engineering and Computer Science Korea Advanced Institute of Science and Technology Daejcon Republic of Korea, see the whole document., 2008.

XP17465886A, Enhancement band for gigabit capable optical access networks; Gigabit capable passive optical networks, International Telecommunication Union, Series G:Transmission Systems and Media, Digital Systems and Networks; Sep. 2007, see the whole document.

* cited by examiner 1260-1280nm 1290-1500nm 1550-1580nm 1260-1280nm 1290-1500nm 1550-1580nm

WAVELENGTH DIVISION MULTIPLEXER COMPATIBLE WITH TWO TYPES OF PASSIVE OPTICAL NETWORKS

TECHNICAL FIELD

The present invention relates to the next generation—passive optical network (NG-PON) combining technologies of Time Division Multiplexing (TDM) and Wavelength Division Multiplexing (WDM) in the field of optical access network communication, and more especially, to a wavelength division multiplexer for upgrading the existing time division multiplexing—passive optical network (TDM-PON) including the ATM-PON, Broadband-PON, Ethernet-PON and Gigabit-PON to the NG-PON or making the existing TDM-PON compatible with the NG-PON.

BACKGROUND OF THE RELATED ART

Optical access network is generally evolving from the broadband passive optical network (B-PON), Gigabit Passive Optical Network (G-PON) and Ethernet Passive Optical Network (E-PON) based on the TDM technology to the NG-PON with multiple wavelengths and high speed based on the combination of the TDM and WDM technologies. Two-way high-speed transmission with multi-wavelength single optical fiber between the optical line terminal (OLT) and the optical network unit (ONU) significantly improves the optical fiber utility.

For the G-PON, the upstream and downstream transmission optical spectrum ranges of the current TDM-PON are specified respectively as that, the range of the downstream S band $\lambda_s$ is 1480 nm~1500 mm, and in order to coexist with the NG-PON, the range of the upstream O band $\lambda_o$ is 1290 nm~1330 nm. ITU-T optical access network G.984.5 mentions that the OLT in the existing TDM-PON is called the legacy OLT, and its working band is the basic band $\lambda_{o+s}$. The OLT in the NG-PON is called the Upgrade OLT. The full service access networks (FSAN) organization specifies the wavelength of the NG-PON, the range of whose upstream wavelength is 1260 nm~1280 nm, and the range of whose downstream wavelength is 1575 nm~1580 nm, and it also specifies that the wavelength range of the CATV downstream signal is 1550 nm~1560 nm.

In order to implement the architecture for the TDM-PON to smoothly upgrade into the NG-PON system or to be compatible with the NG-PON system, wavelength division multiplexing 1 (WDM1, G.984.5 specifies that the name of the wavelength division multiplexer for making the NG-PON compatible with the existing time division multiplexing PON is WDM1) should be inserted between the legacy OLT, the upgrade OLT and the splitter to make the existing TDM-PON and the NG-PON transmit optical signals in different bands with a single optical fiber in the same optical distribution network (ODN), as shown in FIG. 1. WDM1 can make the ODN in the existing TDM-PON transmit the NG-PON optical signal to achieve the smooth upgrading from the TDM-PON to the NG-PON.

Since WDM1 requires high optical signal working band isolation, low optical network insert loss, high practicality, and high performance to price ratio, there is no scheme to implement the WDM1 device module in the prior art.

SUMMARY OF THE PRESENT INVENTION

The technical problem to be solved by the present invention is to provide a wavelength division multiplexer compatible with two PONs so as to achieve the wavelength division multiplexing and de-multiplexing of the optical signals in the basic and upgrade bands.

In order to solve the above problem, the present invention provides a wavelength division multiplexer compatible with two PONs to achieve the compatibility of the NG-PON with the existing TDM-PON, wherein, said existing TDM-PON uses the basic band while the NG-PON uses the upgrade band, and both said basic band and upgrade band comprise upstream and downstream bands, said wavelength division multiplexer comprises the upgrade OLT port, the legacy OLT port and the common port, wherein:

The wavelength division multiplexer also comprises one or more filters, which are used to, in downstream direction, to multiplex an optical signal in a basic band input from the legacy optical line terminal port and an optical signal in an upgrade band input from the upgrade optical line terminal port, and to output the multiplexed optical signal via the common port; in an upstream direction, to de-multiplex a wavelength division multiplexed optical signal input from the common port into the optical signal in the basic band and that in the upgrade band respectively, and to output the optical signal in the basic band via the legacy optical line terminal port and the optical signal in the upgrade band via the upgrade optical line terminal port.

Furthermore, the above wavelength division multiplexer may further have the following features: the wavelength division multiplexer comprises a plurality of filters, and the filters meet the following conditions:

there is at least one filter whose transmission band comprises the upstream band in the basic band and reflection band comprises the upstream band in the upgrade band in an upstream optical channel from a filter de-multiplexing the optical signals in the two upstream bands to the legacy optical line terminal port;

there is at least one filter whose transmission band comprises the upstream band in the upgrade band and the reflection band comprises the upstream band in the basic band in an upstream optical channel from the filter de-multiplexing optical signals in the two upstream bands to the upgrade optical line terminal port;

there is at least one filter whose transmission band comprises the downstream band in the basic band and reflection band comprises a downstream band in the upgrade band in a downstream optical channel from the legacy optical line terminal port to a filter multiplexing optical signals in the two downstream bands; and there is at least one filter whose transmission band comprises the downstream band in the upgrade band and reflection band comprises the downstream band in the basic band in a downstream optical channel from the upgrade optical line terminal port to the filter multiplexing optical signals in the two downstream bands.

Furthermore, the above wavelength division multiplexer may further have the following features: said wavelength division multiplexer comprises a first filter, a second filter, a third filter and a fourth filter, and there are optical channels between the upgrade optical line terminal port and the common port of the first filter, between the reflection port of the first filter and the transmission port or the common port of the fourth filter, between the common port or the transmission port of the fourth filter and the reflection port of the third filter, between the transmission port of the first filter and the reflection port of the second filter, between the legacy optical line terminal port and the transmission port of the second filter, between the common port of the second filter and the transmission port of the third filter, and between the common port of said wavelength division multiplexer and the common port of the third filter.

Furthermore, the above wavelength division multiplexer may further have the following features: said first filter is a band-pass or sideband filter, and the transmission band of said first filter comprises the downstream band in the upgrade band and the reflection band of said first filter comprises the basic band and the upstream band in the upgrade band; said second filter is a sideband filter, and the transmission band of the second filter comprises the basic band and the upstream band in the upgrade band, and the reflection band of said second filter comprises the downstream band in the upgrade band; said third filter is a sideband filter, and the transmission band of said third filter comprises the downstream band in the upgrade band and the basic band, and the reflection band of said third filter comprises the upstream band in the upgrade band; said fourth filter is a band-pass or sideband filter, and the transmission band of the fourth filter comprises the upstream band in the upgrade band, and the reflection band of the fourth filter comprises the downstream band in the upgrade band and the basic band; alternatively said first filter is a band-pass or sideband filter, and the transmission band of said first filter comprises the upstream band in the upgrade band, the reflection band of said first filter comprises the downstream band in the upgrade band and the basic band; said second filter is a sideband filter, and the transmission band of said second filter comprises the downstream band in the upgrade band and the basic band, the reflection band of said second filter comprises the upstream band in the upgrade band; said third filter is a sideband filter, and the transmission band of the third filter comprises the upstream band in the upgrade band and the basic band, the reflection band of the third filter comprises the downstream band in the upgrade band; said fourth filter is a band-pass or sideband filter, and the transmission band of the fourth filter comprises the downstream band in the upgrade band, the reflection band of the fourth filter comprises the basic band and the upstream band in the upgrade band.

Furthermore, the above wavelength division multiplexer may further have the following features: said wavelength division multiplexer comprises a first filter, a second filter, a third filter and a fourth filter, and there are optical channels between the upgrade optical line terminal port and the common port of the first filter, between the reflection port of the first filter and the transmission port of the third filter, between the transmission port of the first filter and the reflection port of the second filter, between the transmission port of the second filter and the transmission port or the common port of the fourth filter, between the common port of the second filter and the reflection port of the third filter, between the common port of the third filter and the common port of said wavelength division multiplexer, and between the common port or the transmission port of said fourth filter and the legacy optical line terminal port.

Furthermore, the above wavelength division multiplexer may further have the following features: said first filter is a band-pass or sideband filter, and the transmission band of the first filter comprises the downstream band in the upgrade band, the reflection band of the first filter comprises the upstream band in the upgrade band and the basic band; said second filter is a sideband filter, and the transmission band of said second filter comprises the upstream band of the upgrade band and the basic band, the reflection band of said second filter comprises the downstream band in the upgrade band; said third filter is a band-pass or sideband filter, and the transmission band of the third filter comprises the upstream band in the upgrade band, the reflection band of the third filter comprises the downstream band in the upgrade band and the basic band; said fourth filter is a sideband filter, and the transmission band of the fourth filter comprises the downstream band in the upgrade band and the basic band, the reflection band of the fourth filter comprises the upstream band in the upgrade band; alternatively said first filter is a band-pass or sideband filter, and the transmission band of the first filter comprises the upstream band in the upgrade band, the reflection band of the first filter comprises the downstream band in the upgrade band and the basic band; said second filter is a sideband filter, and the transmission band of the second filter comprises the downstream band in the upgrade band and the basic band, the reflection band of the second filter comprises the upstream band in the upgrade band; said third filter is a band-pass or sideband filter, and the transmission band of the third filter comprises the downstream band in the upgrade band, the reflection band of the third filter comprises the upstream band in the upgrade band and the basic band; said fourth filter is a sideband filter, and the transmission band of the fourth filter comprises the upstream band in the upgrade band and the basic band, the reflection band of the fourth filter comprises the downstream band in the upgrade band.

Furthermore, the above wavelength division multiplexer may further have the following features: said wavelength division multiplexer comprises a first filter, a second filter, a third filter and a fourth filter, and there are optical channels between the upgrade optical line terminal port and the common port of the first filter, between the reflection port of the first filter and the transmission port or the common port of the second filter, between the transmission port of the first filter and the reflection port of the fourth filter, between the common port or the transmission port of the second filter and the reflection port of the third filter, between the common port of the third filter and the transmission port of the fourth filter, between the transmission port of the third filter and the legacy optical line terminal port, and between the common port of the fourth filter and the common port of said wavelength division multiplexer.

Furthermore, the above wavelength division multiplexer may further have the following features: said first filter is a band-pass or sideband filter, and the transmission band of the first filter comprises the upstream band in the upgrade band, the reflection band of the first filter comprises the downstream band in the upgrade band and the basic band; said second filter is a band-pass or sideband filter, and the transmission band of the second filter comprises the downstream band in the upgrade band, the reflection band of the second filter comprises the upstream band in the upgrade band and the basic band; said third filter is a band-pass or sideband filter, and the transmission band of the third filter comprises the upstream band in the upgrade band and the basic band, the reflection band of the third filter comprises the downstream band in the upgrade band; said fourth filter is a sideband filter, and the transmission band of the fourth filter comprises the downstream band in the upgrade band and the basic band, the reflection band of the fourth filter comprises the upstream band in the upgrade band; alternatively said first filter is a band-pass or sideband filter, and the transmission band of the first filter comprises the downstream band in the upgrade band, the reflection band of the first filter comprises the upstream band in the upgrade band and the basic band; said second filter is a band-pass or sideband filter, and the transmission band of the second filter comprises the upstream band in the upgrade band, the reflection band of the second filter comprises the downstream band in the upgrade band and the basic band; said third filter is an sideband filter, and the transmission band of the third filter comprises the downstream band in the upgrade band and the basic band, the reflection band of the third filter comprises the upstream band in the upgrade band; said fourth filter is a sideband filter, and the transmission band of the fourth filter comprises the upstream band in the upgrade band and the basic band, the reflection band of the fourth filter comprises the downstream band in the upgrade band.

Furthermore, the above wavelength division multiplexer may further have the following features: said wavelength division multiplexer comprises a band-pass filter, and there are optical channels between a transmission port of the band-pass filter and the legacy optical line terminal port, between a common port of the band-pass filter and the common port of said wavelength division multiplexer, and between a reflection port of the band-pass filter and the upgrade optical line terminal port; and a transmission band of the band-pass filter comprises the basic band, and a reflection band of the band-pass filter comprises the upgrade band; alternatively there are optical channels between the transmission port of the band-pass filter and the upgrade optical line terminal port, between the common port of the filter and the common port of said wavelength division multiplexer, and between the reflection port of the filter and the legacy optical line terminal port, and the transmission band of the band-pass filter comprises the upgrade band and the reflection band of the band-pass filter comprises the basic band.

Furthermore, the above wavelength division multiplexer may further have the following features: composition of a plurality of filters of the wavelength division multiplexer and spectral properties of the filters are in one of the following modes:

mode 1: said wavelength division multiplexer comprises a first filter, a second filter and a third filter, the transmission band of the first filter comprises the downstream band in the upgrade band, and the reflection band of the first filter comprises the upstream band in the upgrade band and the basic band; the transmission band of the second filter comprises the upstream band in the upgrade band, and the reflection band of the second filter comprises the downstream band in the upgrade band and the basic band; the transmission band of the third filter comprises the basic band, and the reflection band of the third filter comprises the upgrade band; in connection, there are optical channels between the upgrade optical line terminal port and a common port of the first filter, between a reflection port of the first filter and a transmission port of the second filter, between a transmission port of the first filter and a reflection port of the second filter, between a common port of the second filter and a reflection port of the third filter, between a transmission port of the third filter and the legacy optical line terminal port, and between a common port of the third filter and a common port of said wavelength division multiplexer;

mode 2: positions of the first filter and the second filter in mode 1 are exchanged, and the spectral property of each filter is the same as that in mode 1;

mode 3: said wavelength division multiplexer comprises a first filter and a second filter, a transmission band of the first filter comprises the basic band and a reflection band of the first filter comprises the upgrade band; a transmission band of the second filter comprises the upgrade band and the reflection band of the second filter comprises the basic band; in connection, there are optical channels between the legacy optical line terminal port and the transmission port of the first filter, between a common port of the wavelength division multiplexer and a common port of the first filter, between the upgrade optical line terminal port and a transmission port or a common port of the second filter, and between the common port or the transmission port of the second filter and a reflection port of the first filter;

mode 4, said wavelength division multiplexer comprises a first filter and a second filter, a transmission band of the first filter comprises the upgrade band and a reflection band of the first filter comprises the basic band; a transmission band of the second filter comprises the basic band and a reflection band of the second filter comprises the upgrade band; in connection, there are optical channels between a transmission port of the first filter and the upgrade optical line terminal port, between a reflection port of the first filter and a transmission port or a common port of the second filter, between a common port of the first filter and a common port of said wavelength division multiplexer, and between the common port or the transmission port of the second filter and the legacy optical line terminal port;

mode 5: said wavelength division multiplexer comprises a first filter, a second filter and an third filter, a transmission band of the first filter comprises the upgrade band and a reflection band of the first filter comprises the basic band; a transmission band of the second filter comprises the upstream band in the upgrade band and the basic band and a reflection band of the second filter comprises the downstream band in the upgrade band; a transmission band of the third filter comprises the downstream band in the upgrade band and the basic band and a reflection band of the third filter comprises the upstream band in the upgrade band; in connection, there are optical channels between a transmission port of the first filter and the upgrade optical line terminal port, between a common port of the first filter and a common port of said wavelength division multiplexer, between a reflection port of the first filter and a common port or a transmission port of the second filter, between the transmission port or the common port of the second filter and the common port or the transmission port of the first filter, and between the transmission port or the common port of the first filter and the legacy optical line terminal port;

mode 6: positions of the second filter and the third filter in mode 5 are exchanged, and the spectral property of each filter is the same as that in mode 5.

Furthermore, the above wavelength division multiplexer may further have the following features: the filters in said wavelength division multiplexer are thin film filters.

Furthermore, the above wavelength division multiplexer may further have the following features: the upstream band in said upgrade band is 1260 nm~1280 nm, and the downstream band in said upgrade band is 1550 nm~1580 nm; the upstream band in said basic band is 1290 nm~1330 nm, that is, the O band, and the downstream band in said basic band is 1480 nm~1500 nm, that is, the S band.

WDM1 provided by the present invention implements the wavelength division multiplexing and de-multiplexing of the optical signals in the basic and upgrade bands. It makes the ODN in the existing TDM-PON able to transport the NG-PON at the same time, so as to smoothly upgrade the deployed TDM-PON to the NG-PON and provide subsequent network compatibility to the deployed TDM-PON system. In some embodiments, relatively low cost can still meet the high isolation requirement of the optical signal in working band by reasonably using the thin film filters and selecting the spectral properties of the filters, moreover, the requirements for the isolation and the optical network insert loss can be taken into account by setting the number of filters and their spectral properties. A simple but practical technology applied in the embodiment of the present invention implements WDM1 with low lost and high, moreover, the system is easy to use and upgrade.

BRIEF DESCRIPTION OF DRAWINGS

FIG. 2 (b)~FIG. 2 (i) respectively illustrate the spectral property of each filter in the first embodiment and its alternatives;

FIG. 3 (b)~FIG. 3 (d) respectively illustrate the spectral property of each filter in the second embodiment;

FIG. 4 (b) illustrates the spectral property of the filter in the third embodiment;

FIG. 5 (b) illustrates the spectral property of the filter in the fourth embodiment;

FIG. 6 (b)~FIG. 6 (c) respectively illustrate the spectral property of each filter in the fifth embodiment;

FIG. 7 (b)~FIG. 7 (c) respectively illustrate the spectral property of each filter in the sixth embodiment;

FIG. 8 (b)~FIG. 8 (d) respectively illustrate the spectral property of each filter in the seventh embodiment;

FIG. 9 (b)~FIG. 9 (d) respectively illustrate the spectral property of each filter in the eighth embodiment;

FIG. 10 (b)~FIG. 10 (d) respectively illustrate the spectral property of each filter in the ninth embodiment;

FIG. 11 (b)~FIG. 11 (i) respectively illustrate the spectral property of each filter in the tenth embodiment and its alternatives;

FIG. 12 (b)~FIG. 12 (e) respectively illustrate the spectral property of each filter in the eleventh embodiment;

PREFERRED EMBODIMENTS OF THE PRESENT INVENTION

Figure 1:
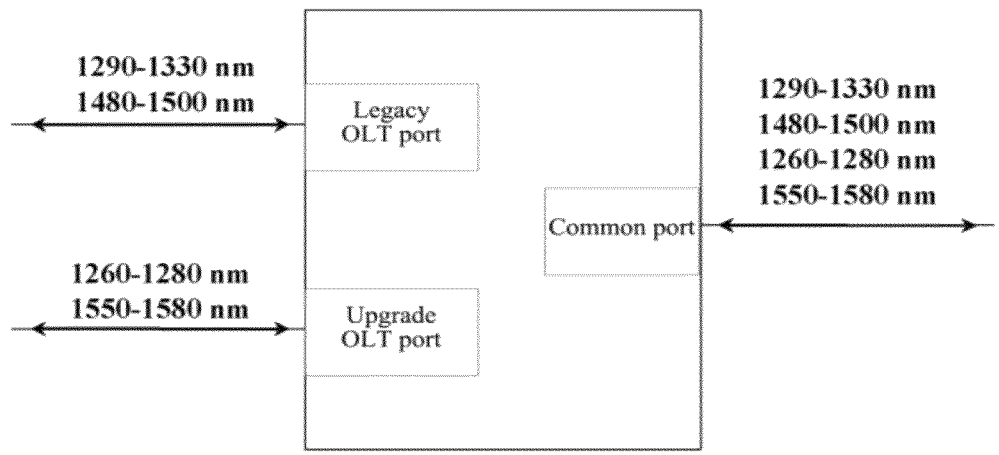
FIG. 1 illustrates the structure of the external interfaces of WDM1 in accordance with an embodiment of the present invention.

The embodiments of the present invention will be described in detail with reference to the accompanying figures.

When the existing TDM-PON on a single optical fiber evolves into the NG-PON, three bands, respectively the upstream band (1260 nm~1280 nm) of the NG-PON, the downstream band (1550 nm~1560 nm) of the CATV signals, and the downstream L band (1575 nm~1580 nm) of the NG-PON, will be introduced. Therefore, the upgrade band in the context comprises an upstream band and a downstream band, wherein, the upstream band is 1260 nm~1280 nm and the downstream band is 1550 nm~1580 nm, including 1550 nm~1560 nm and 1575 nm~1580 nm. While the basic band also comprises an upstream band and a downstream band, wherein, the upstream band is 1290 nm~1330 nm, that is, the O band, and the downstream band is 1480 nm~1500 nm, that is, the S band. It should be noted that, the above wavelength assignment can be modified, as long as the distribution relationship of the above four bands is unchanged, WDM1 in the present invention still can be used.

In order to smoothly upgrade the TDM-PON on the single optical fiber to the NG-PON, one of the key problems is to insert a WDM1 between the OLT and the splitter to implement the wavelength division multiplexing of the optical signals in the basic and upgrade bands, meanwhile meeting as much as possible the requirement of low cost, high reliability, easy-for-use and easy-for-system upgrade. As the access point of the optical signals with different wavelengths, the wavelength division multiplexer needs to meet the following requirements:

A. implement the functions of wavelength division multiplex and de-multiplex of the wavelength division multiplexed optical signal in the NG-PON and the optical signal in the existing TDM-PON in the existing ODN;

B. keep high isolation between the optical signal in the basic band and that in the upgrade band; and C. have low insert loss.

In the fabricating technology of the filter used as the wavelength division multiplexer, thin film filter is relatively suitable to be a broadband filter and its fabricating technology is relatively mature, therefore, it can be used in WDM1. The thin film filter has the functions of transmission and reflection, and the corresponding working bands can be called as the transmission band and the reflection band. For common thin film filters, the isolation of the transmission port typically works well enough that it is less possible to interfere with the optical signals in other bands, the isolation can reach 35 dB. While the isolation of the reflection port is relatively worse, which is 15 dB, and the optical signals in the transmission band can interfere with those in the reflection port, and enforced measurements should be adopted. The insert loss is proportional with the number of thin film filters. Therefore, the minimum number of filters is preferred as long as the isolation meets the requirement. The following embodiments are implemented with thin film filters, however, the present invention does not limit the type of the adopted filter, and any filter which can achieve the same spectral property can be applied in WDM1 in the present invention.

In the network system architecture of the NG-PON compatible with the existing TDM-PON, the central office is configured with the legacy OLT and the upgrade OLT, and the external interfaces of WDM1 are as shown FIG. 1, and the interfaces comprise the legacy OLT port, the upgrade OLT port and the common port:

In the downstream direction, the optical signals in the basic band are input to the legacy OLT port, the optical signals in the upgrade band are input to the upgrade OLT port, the wavelength division multiplexer multiplexes the input optical signal in the basic band and that in the upgrade band and outputs the multiplexed signal to the common port, so that the optical signals in two bands are transmitted in a single optical fiber and transmitted to each ONU device via optical devices such as the splitter; in upstream direction, the wavelength division multiplexed optical signals in the two bands are input from the common port of WDM1 via the same optical fiber, and WDM1 de-multiplexes the optical signals and sends the optical signals in the basic band to the legacy OLT port and those in the upgrade band to the upgrade OLT port respectively.

The whole bandwidth of the basic band is 210 nm (the range of the downstream S band is 1480 nm~1500 nm, and the range of the upstream O band is 1290 nm~1330 nm), the upstream and downstream bands of the upgrade band are distributed outside the basic band in both sides upstream band is 1260 nm~1280 nm, and the downstream band is 1550 nm~1580 nm, herein the downstream band comprises two parts, the CATV downstream band and the NG-PON downstream band). Therefore, it can be seen that the interval between the upstream band in the basic band and the upstream band in the upgrade band is relatively narrow, about 10 nm. Therefore, the bandwidth of the basic band is relatively wide, and the band interval between the two bands is relatively narrow.

The present invention will be illustrated with embodiments in the following. It should be understood that the preferred embodiments to be described in the following are only used to illustrate and explain rather than to limit the present invention. In the case that there is no conflict, the embodiments and features in the embodiments in this application can be combined.

The specific structure of a plurality of embodiments for implementing WDM1 will be described in further detail with reference to the accompanying figures:

The First Embodiment

Due to factors such as the WDM1 fabricating technology, the requirement of telecommunication network application and the cost, WDM1 can be assembled with the sideband filters and/or band-pass filters according to the features of the basic and upgrade bands.

Figure 2A:
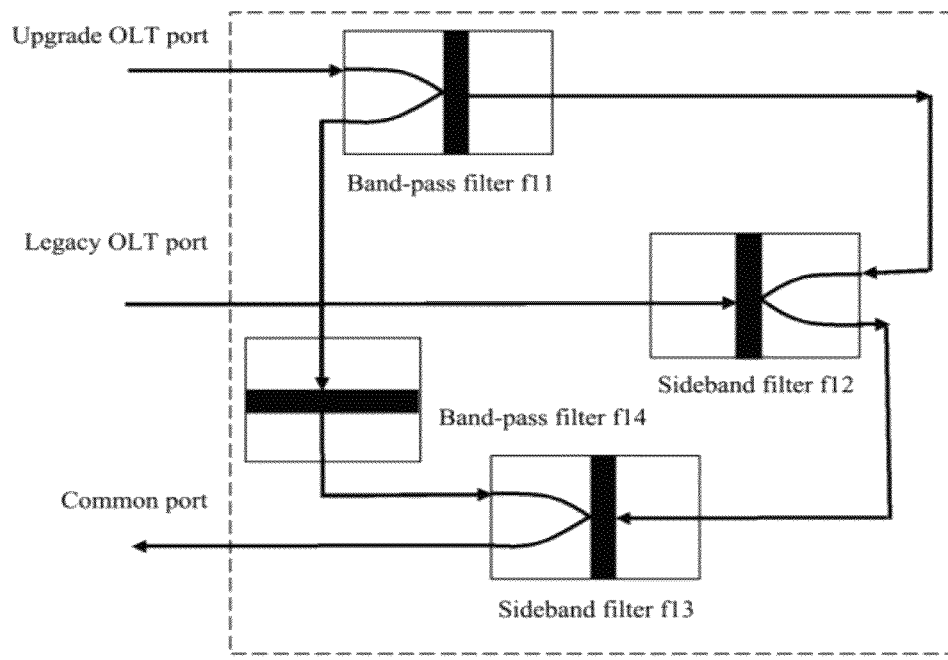
FIG. 2 (a) illustrates the structure of WDM1 in accordance with a first embodiment of the present invention, and it illustrates the optical transmission paths in upstream and downstream directions.
Figure 2B:
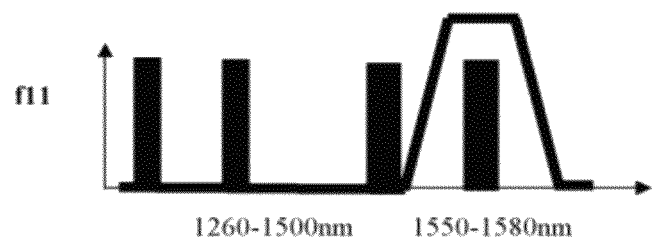
Figure 2C:
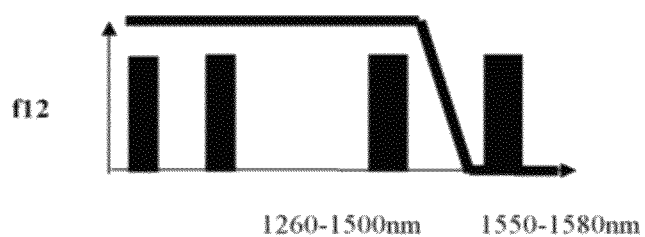
Figure 2D:
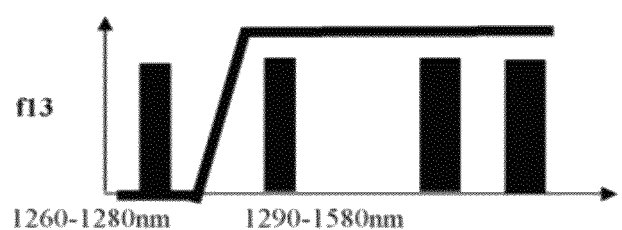
Figure 2E:
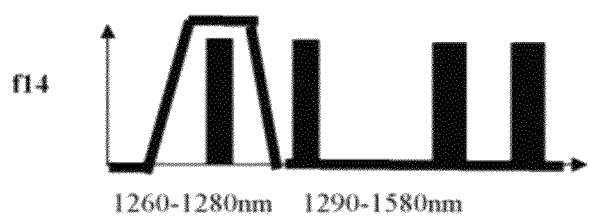
Figures 2F, 2G:
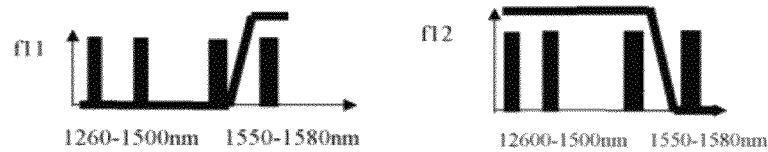

FIG. 2(a) illustrates the structure of WDM1 and its working principle in upstream/downstream direction in accordance with this first embodiment, and this WDM1 comprises four thin film filters: the band-pass filter f11, the sideband filter f12, the sideband filter f13 and the band-pass filter f14. Both the sideband and the band-pass filter can be three-port devices including a transmission port, a reflection port and a common port. Some band-pass or sideband filter such as f14 might be a two-port device including a transmission port and a common port. In FIG. 2 (a), the reflection port and the common port are at the same side of the filter, while the transmission port is at the other side. The reflection port is in the direction opposite to the arrow in the transmission port line (toward or depart from the filter).

Refer to the spectrums illustrated in FIG. 2(b)~FIG. 2(e). The transmission band of the band-pass filter f11 includes 1550 nm~1580 nm, and the reflection band of f11 includes 1260 nm~1500 nm; the transmission band of the band-pass filter f12 includes 1260 nm~1500 nm, and the reflection band of f12 includes 1500 nm~1580 nm; the transmission band of the sideband filter f13 includes 1290 nm~1580 nm, the reflection band of f13 includes 1260 nm~1280 nm; the transmission band of the band-pass filter f14 includes 1260 nm~1280 nm, and the reflection band of f14 includes 1290 nm~1580 nm.

Refer to FIG. 2(a), there are optical channels between the upgrade OLT port and the common port of the band-pass filter f11, between the reflection port of the band-pass filter f11 and the transmission port of the band-pass filter f14, between the common port of the band-pass filter f14 and the reflection port of the sideband filter f13, between the transmission port of the band-pass filter f11 and the reflection port of the sideband filter f12, between the legacy OLT port and the transmission port of the sideband filter f12, between the common port of the sideband filter f12 and the transmission port of the sideband filter f13, and between the WDM1 common port and the common port of the sideband filter f13. The common port and the transmission port of f14 can be exchanged. For convenience, some optical channels in FIG. 2 (a) are represented with polygonal lines, while the optical channels in the practical device are usually represented with straight line, although there is still the case that the transmission direction of the optical signals in an optical channel might change by adding reflection devices. The other embodiments are similar. The arrows in FIG. 2 (a) are shown taking the downstream direction as an example; however, the upstream direction can be achieved by reversing all the arrow directions.

In the downstream direction, after the downstream signal (whose wavelength is between 1550 nm and 1580 nm) in the NG-PON inputs from the upgrade OLT port of WDM1, it enters into the common port of the band-pass filter f11, and after transmitted through the band-pass filter f11, the signal enters into the sideband filter f12, after reflected by the sideband filter f12, the signal enters into the transmission port of the sideband filter f13, and after transmitted through f13, the signal is output to the common port of WDM1 via the common port of the sideband filter f13; meanwhile, the downstream signal in the G-PON (whose wavelength is between 1480 nm and 1500 nm) enters into the transmission port of the sideband filter f12 after transmitted from the legacy OLT port of WDM1, and then enters into the transmission port of the sideband filter f13 after output from the common port of the sideband filter f12, and after transmitted through the transmission port of f13, the signal is output from the common port of the sideband filter f13 to the common port of WDM1. Therefore, the signal output from the common port of WDM1 is the signal generated by wavelength division multiplexing the NG-PON downstream signal and the G-PON downstream signal.

In the upstream direction, the wavelength division multiplexed signal input from the common port of WDM1 comprises the upstream signal in the GN-PON (between 1260 nm and 1280 nm) and the upstream signal in the G-PON (between 1290 nm and 1330 nm), wherein, the upstream signal in the NG-PON enters into the common port of the sideband filter f13 after transmitted from the common port of WDM1, and then enters into the common port of the band-pass filter f14 after reflected by the sideband filter f13, then the signal is output to the reflection port of the band-pass filter f11 via the transmission port of f14 after transmitted through f14, and then output to the upgrade OLT port of WDM1 via the common port of f11 after reflected by f11; meanwhile, the upstream signal in the G-PON enters into the common port of the sideband filter f13 after input from the common port of WDM1, and then enters into the common port of the sideband filter f12 after output from the transmission port of f13, and then output to the legacy OLT port of WDM1 via the transmission port of f12 after transmitted through the sideband filter f12. The de-multiplexing is completed.

Not only implementing the wavelength division multiplexing and de-multiplexing, the WDM1 in the present embodiment can also meet the requirement of high isolation between the upgrade band and the basic band. The interference between the upstream band in the upgrade band and the upstream band in the basic band, and between the downstream band in the basic band and the downstream band in the upgrade band should be taken into account.

It has been mentioned that there is high isolation at the transmission port of the filter, if there is at least one filter whose transmission band comprises the upstream band in the basic band and reflection band comprises the upstream band in the upgrade band in the upstream optical channel from the filter de-multiplexing the optical signals in the two upstream bands to the legacy OLT port of WDM1 (including the de-multiplexing filter), and there is at least one filter whose transmission band comprises the upstream band in the upgrade band and reflection band comprises the upstream band in the basic band in the upstream optical channel from the filter for de-multiplexing the optical signals in the two upstream bands to the upgrade OLT port of WDM1 (including the filter for de-multiplexing), regular filters can meet the requirement of isolation between the two upstream bands. If there is at least one filter whose transmission band comprises the downstream band in the basic band and reflection band comprises the downstream band in the upgrade band in the downstream optical channel from the legacy OLT port of WDM1 to the filter for multiplexing the optical signals in the two downstream bands (including the multiplexing filter), and there is at least one filter whose transmission band comprises the downstream band in the upgrade band and reflection band comprises the downstream band in the basic band in the downstream optical channel from the upgrade OLT port of WDM1 to the filters for multiplexing the optical signals in the two downstream bands (including the multiplexing filter), the requirement of isolation between the two downstream bands can be met. The above four conditions are collectively called as the first isolation condition in the following.

Figures 2H, 2I:
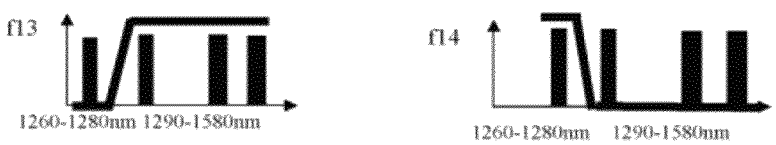
Figure 3A:
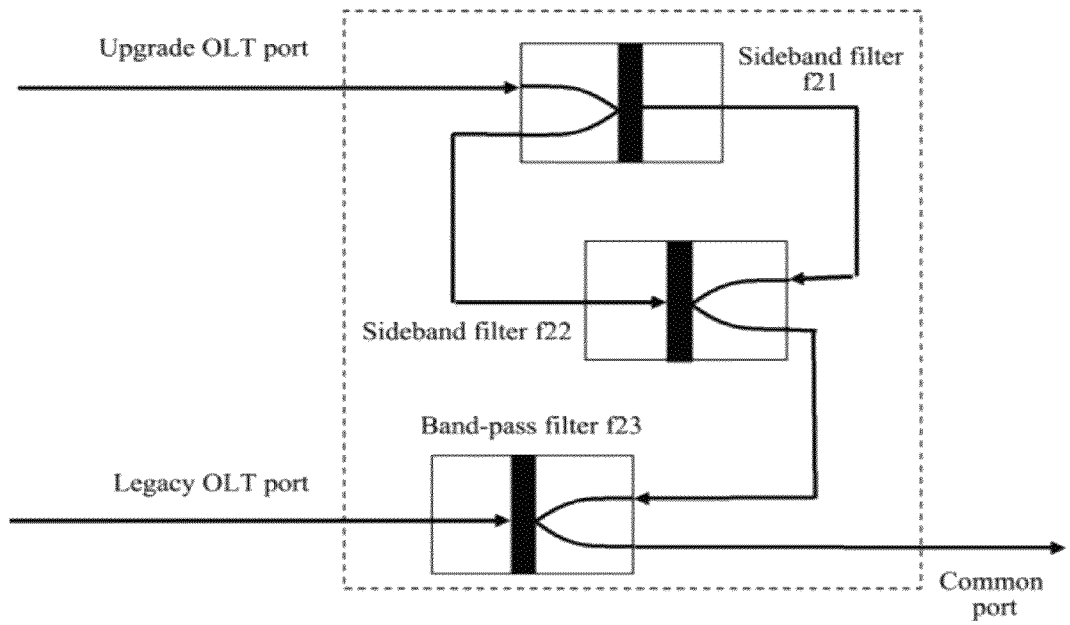
FIG. 3 (a) illustrates of the structure of WDM1 in accordance with a second embodiment of the present invention.
Figure 3B:
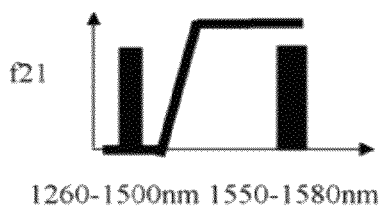
Figure 3C:
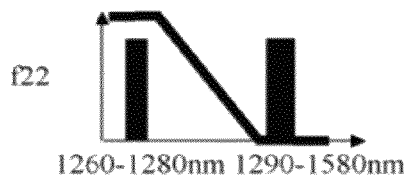
Figure 3D:
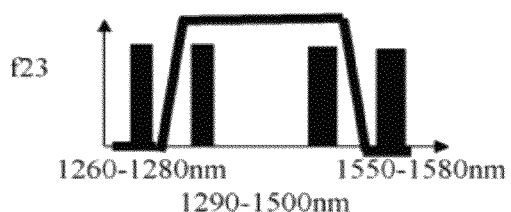

The present embodiment can meet this requirement, and the filter for de-multiplexing the optical signals in the two upstream bands is f13, and the filters in the upstream optical channel from f13 to the legacy OLT port comprise f13 and f12, the upstream band in the basic band falls within the transmission band of f13 and the upstream band in the upgrade band falls within the reflection band of f13. The filters in the upstream optical channel from f13 to the upgrade OLT port comprise f13, f14 and f11, wherein, the upstream band in the upgrade band falls within the transmission band of f14 and the upstream band in the basic band falls within the reflection band of f14. Moreover, the filter for multiplexing the optical signals in the two downstream bands is f12 (multiplexing two signals means that two signals are separate from each other when being input into the filter and will be combined into one when being output), the filters in the downstream optical channel from the legacy OLT port to f12 is f12, and the transmission band of f12 comprises the downstream band in the basic band and the reflection band of f12 comprises the downstream band in the upgrade band, the filters in the downstream optical channel from the upgrade OLT port to f12 comprise f11 and f12, the transmission band of f11 comprises the downstream band in the upgrade band and the reflection band in f11 comprises the downstream band in the basic band. Therefore, the present embodiment can guarantee the isolation between the two upstream bands as well as that between two downstream bands, moreover, all filters can be implemented with regular filters, so as to decrease the cost of WDM1, and some variations can be obtained by modifying the types of the above filters and their spectral properties:

Variation 1, whose structural diagram is still as shown in FIG. 2 (a), and its spectrograms are as shown in FIG. 2 (f)~FIG. 2(i), and the band-pass filter f11 is modified to an sideband filter, 1550 nm~1580 nm is in its transmission band and 1260 nm~1500 nm is in its reflection band; the band-pass filter f14 is modified to a sideband filter, 1260 nm~1280 nm is in its transmission band, and 1290 nm~1580 nm is in its reflection band. While the types and spectral properties of f12 and f13 keep unchanged. Since the transmission/reflection relationship of the upstream and downstream bands in the basic band and the upstream and downstream bands in the upgrade band (also called the four related bands of WDM1) keep unchanged in the spectral properties of the filters in this modification, their performance is basically the same. It is also feasible that only one of f11 and f14 rather than both of them is changed in this variation.

Variation two, the structure is still as shown in FIG. 2 (a), f11~f14 are all sideband filters, and their spectral properties are as follows: the transmission band of the sideband filter f11 comprises 1260 nm~1280 nm, and the reflection band of f11 comprises 1290 nm~1580 nm; the transmission band of the sideband filter f12 comprises 1290 nm~1580 nm, and the reflection band of f12 comprises 1260 nm~1280 nm; the transmission band of the sideband filter f13 comprises 1260 nm~1500 nm, and the reflection band of f13 comprises 1550 nm~1580 nm; the transmission band of the sideband filter f14 comprises 1550 nm~1580 nm, and the reflection band of f14 comprises 1260 nm~1500 nm.

Variation three: on the basis of variation two, the sideband filter f11 and/or the sideband filter f14 are modified to the band-pass filters, and the transmission or reflection relationship of the four related bands in the spectral properties of band-pass filters f11 and f14 are the same as those of f11 and f14 in variation two.

With the similar analysis as given above, the function of WDM1 can be achieved and the requirement of high isolation can be met. Similarly, the parameters achieved by said WDM1 device module are shown in table 1.

TABLE 1

| the parameters of said WDM1 device module shown in FIG. 2 (a) | |
|---|---|
| Specification | Value |
| TDM-PON loss range (connector is not considered) | <1.0 dB |
| | 1290-1330 nm |
| | 1480-1500 nm |
| NG-PON loss range (connector is not considered) | <1.3 dB |
| | 1260-1280 nm |
| | 1550-1580 nm |
| Isolation - COM - OLT 1260-1280 nm 1550-1580 nm | >35 dB |
| Isolation - COM - UPGRADE 1260-1280 nm 1550-1580 nm | >35 dB |
| Maximum optical power | +23 dBm |
| Return loss | >50 dB |
| Directivity | >50 dB |

The Second Embodiment

WDM1 in this embodiment comprises three thin film filters: the sideband filter f21, the sideband filter f22 and the band-pass filter f23 respectively. FIG. 3 (b) to FIG. 3 (d) show the spectral property of each filter respectively. Wherein, 1550 nm~1580 nm is in the transmission band of the sideband filter f21, 1260 nm~1500 nm is in the reflection band of the sideband filter f21; 1260 nm~1280 nm is in the transmission band of the sideband filter f22; 1290 nm~1580 nm is in the reflection band of f22; 1290 nm~1500 nm is in the transmission band of the band-pass filter f23, and 1260 nm~1280 nm and 1550 nm~1580 nm are in the reflection band of f23.

There are optical channels between the upgrade OLT port of WDM1 and the common port of the sideband filter f21, between the reflection port of the sideband filter f21 and the transmission port of the sideband filter f22, between the transmission port of the sideband filter f21 and the reflection port of the sideband filter f22, between the common port of the sideband filter f22 and the reflection port of the band-pass filter f23, between the transmission port of the band-pass filter f23 and the legacy OLT port of WDM1, and between the common port of the band-pass filter f23 and the common port of WDM1.

In the downstream direction, after the downstream signal (whose wavelength is 1550 nm~1580 nm) in the NG-PON is input from the upgrade OLT port of WDM1, it enters into the common port of the sideband filter f21, and then enters into the reflection port of the sideband filter f22 after transmitted through the sideband filter f21, and then the signal is output from the common port of band-pass filter f22 to the reflection port of the band-pass filter f23 after reflected by the sideband filter f22, and then output from the common port of the band-pass filter f23 to the common port of WDM1 after reflected by f23; meanwhile, the downstream signal (whose wavelength is in 1480 nm~1500 nm) in the G-PON enters into the transmission port of the band-pass filter f23 after transmitted from the legacy OLT port of WDM1, and after transmitted by the band-pass filter f23, the signal is output from the common port of f23 to the common port of WDM1 for output, therefore, the signal output from the common port of WDM1 is the signal generated by wavelength division multiplexing the downstream signal in the NG-PON and that in the G-PON.

In the upstream direction, the wavelength division multiplexed signals input from the common port of WDM1 comprise the upstream signal in the NG-PON and the upstream signal in the G-PON, wherein, the upstream signal in the NG-PON enters into the common port of the band-pass filter f23 after transmitted from the common port of WDM1, and after reflected by the band-pass filter f23, the signal is output by the reflection port of f23 and enters into the common port of the sideband filter f22, and after transmitted through f22, the signal is output to the reflection port of the sideband filter f21 from the transmission port of the sideband filter f22, and after reflected by the sideband filter f21, the signal is output to the upgrade OLT port of WDM1 from the common port of f21; meanwhile, the upstream signal in the G-PON enters into the common port of the band-pass filter f23 after transmitted from the common port of WDM1, and after transmitted by the band-pass filter f23, the signal is output to the legacy OLT port of WDM1 via the transmission port of the band-pass filter f23.

It can be seen that this embodiment also meets the above first isolation condition. Since the difficulty in fabricating technology of the thin film filter is proportional to the band-pass width and isolation of the filter, while reversely proportional to the protection bandwidth interval. The sideband filter f21 and the sideband filter f22 enhance the isolation in the reflection direction, and indirectly decrease the requirement of isolation in the reflection direction of the band-pass filter f23, and therefore decrease the difficulty in fabricating the thin film filter, which reduces the number of coating layers in the thin film filter and the fabricating difficulty, so as each filter in the first embodiment. Moreover, since the band-pass width of the band-pass filter f23 in this embodiment is relatively large, the band-pass filter f23 is more difficult to be implemented compared to the filter in the first embodiment, and the cost of WDM1 in the first embodiment is relatively inexpensive.

The parameters achieved by the WDM1 device module in the present embodiment are shown in Table 2.

TABLE 2

| the parameters of the WDM1 device module shown in FIG. 2 (b) | |
|---|---|
| Specification | Value |
| TDM-PON loss range (connector is not considered) | <0.5 dB<br>1290-1330 nm<br>1480-1500 nm |
| NG-PON loss range (connector is not considered) | <1.1 dB<br>1260-1280 nm<br>1550-1580 nm |
| Isolation - COM - OLT<br>1260-1280 nm<br>1550-1580 nm | >35 dB |
| Isolation - COM - UPGRADE<br>1260-1320 nm<br>1480-1500 nm | >35 dB |
| Maximum optical power | +23 dBm |
| Return loss | >50 dB |
| Directivity | >50 dB |

The Third Embodiment

Figure 4A:
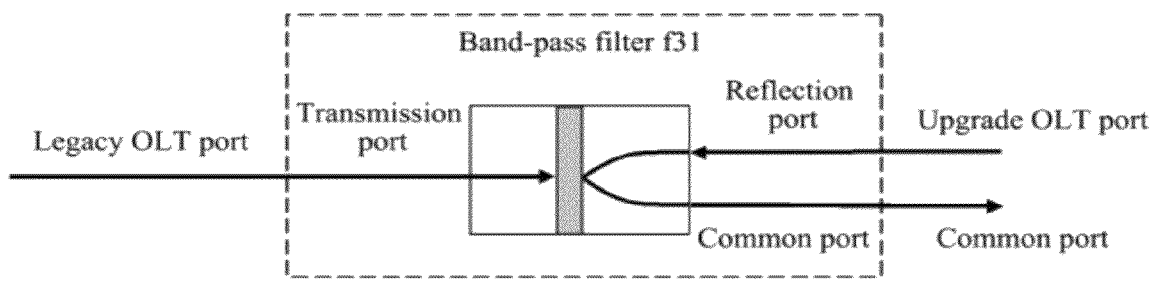
FIG. 4 (a) illustrates the structure of WDM1 in accordance with a third embodiment of the present invention.
Figure 4B:
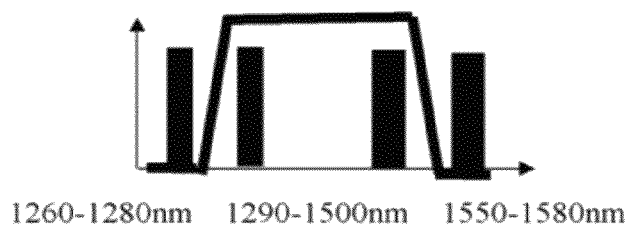

When applying a more advanced coating technology, the band-pass filter f31 can be directly used to implement the above wavelength division multiplexing/de-multiplexing function, that is, use the band-pass thin film filter to make the broad band-pass WDM1 with high isolation to implement the wavelength division multiplexing/de-multiplexing function of the basic and upgrade bands and the requirements of high isolation, the upstream and downstream working principles of WDM1 are as shown in FIG. 4 (a), and there are optical channels between the transmission port of f31 and the legacy OLT port of WDM1, between the common port of f31 and the common port of WDM1, and between the reflection port of f31 and the upgrade OLT port of WDM1.

FIG. 4 (b) is an illustration of the spectral property of f31, wherein, 1290 nm~1500 nm is in the transmission band of f31, 1260 nm~1280 nm and 1550 nm~1580 nm are in the reflection band of f31. Via the band-pass filter f31, the multiplexing and de-multiplexing of the optical signals in the basic and upgrade bands can be directly implemented.

This embodiment applies a single band-pass filter f31 to implement the above wavelength division multiplexing/de-multiplexing function; alternatively, a plurality of f31s can be assembled together to implement the above wavelength division multiplexing/de-multiplexing function.

The Fourth Embodiment

Figure 5A:
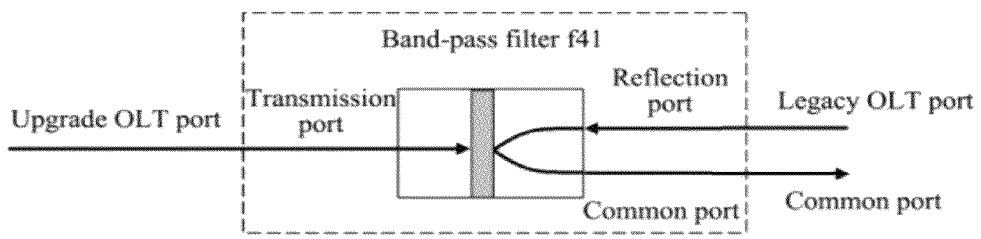
FIG. 5 (a) illustrates the structure of WDM1 in accordance with a fourth embodiment of the present invention.
Figure 5B:
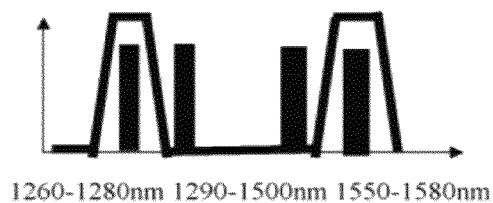

WDM1 in this embodiment also only applies one band-pass filter f41, as shown in FIG. 5 (a), there are optical channels between the transmission port of f41 and the upgrade OLT port of WDM1, between the common port of f41 and the common port of WDM1, and between the reflection port of f41 and the legacy OLT port of WDM1.

FIG. 5 (b) is an illustration of the spectral property of f41, wherein, 1290 nm~1500 nm is in the reflection band of f41, 1260 nm~1280 nm and 1550 nm~1580 nm are in the transmission band of f41. With the band-pass filter f41, the multiplexing and de-multiplexing of the optical signals in the basic and upgrade bands can be directly implemented.

The Fifth Embodiment

Figure 6A:
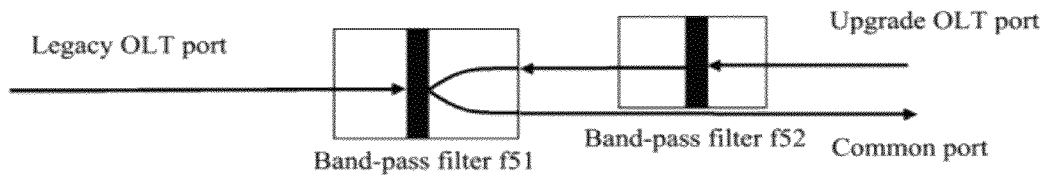
FIG. 6 (a) illustrates the structure of WDM1 in accordance with a fifth embodiment of the present invention.
Figure 6B:
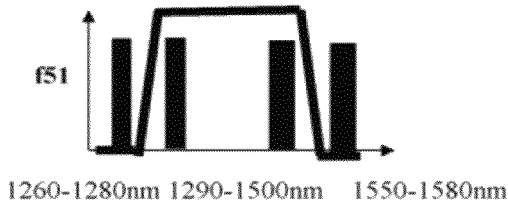
Figure 6C:
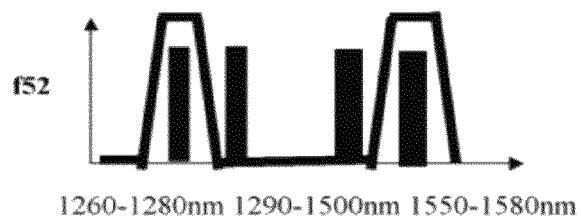

As shown in FIG. 6 (a), the WDM1 in this embodiment comprises the band-pass filter f51 and the band-pass filter f52. 1290 nm~1500 nm is in the transmission band of f51, 1260 nm~1280 nm and 1550 nm~1580 nm are in the reflection band of f51. 1290 nm~1500 nm is in the reflection band of f52, 1260 nm~1280 nm and 1550 nm~1580 nm are in the transmission band of f52.

In connection, there are optical channels between the legacy OLT port of WDM1 and the transmission port of f51, between the common port of WDM1 and the common port of f51, between the upgrade OLT port of WDM1 and the transmission port of f52, and between the common port of f52 and the reflection port of f51. The common port and transmission port of f52 can be exchanged.

Based on the optical signal transmission path indicated in FIG. 6(a) (which will not be described in detail here since it is clearly shown in FIG. 6(a)), the multiplexing and de-multiplexing of optical signals in the upgrade and basic bands can be achieved, and the above first isolation condition is meet as well and the insertion loss is relatively low.

The Sixth Embodiment

Figure 7A:
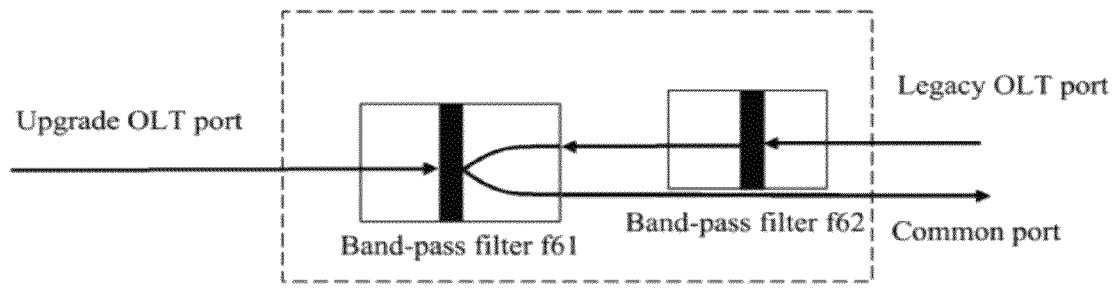
FIG. 7 (a) illustrates the structure of WDM1 in accordance with a sixth embodiment of the present invention.
Figure 7B:
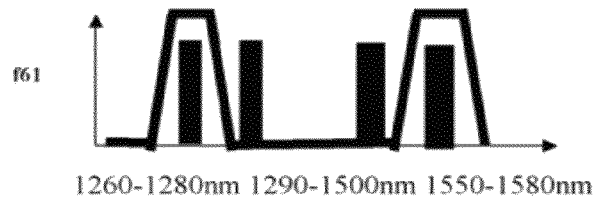
Figure 7C:
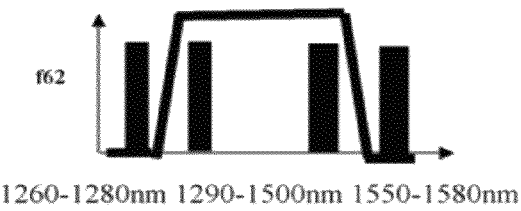

As shown in FIG. 7 (a), WDM1 in this embodiment comprises the band-pass filters f61 and f62, wherein, the spectral property of f61 is the same as that of f52 in the fifth embodiment, and the spectral property of f62 is the same as that of f51 in the fifth embodiment.

The connection relationships among the filters as well as that between the filters and the port of WDM1 change correspondingly, wherein, there are optical channels between the transmission port of the band-pass filter f61 and the upgrade OLT port of WDM1, between the reflection port of f61 and the transmission port of f62, between the common port of f61 and the common port of WDM1, and between the common port of f62 and the legacy OLT port of WDM1. The common port and the transmission port of f62 can be exchanged.

Similarly, WDM1 in the present embodiment can achieve the multiplexing and de-multiplexing of the optical signals in the upgrade band and basic band, and it also meets the above first isolation condition and has relatively low insertion loss.

The Seventh Embodiment

Figure 8A:
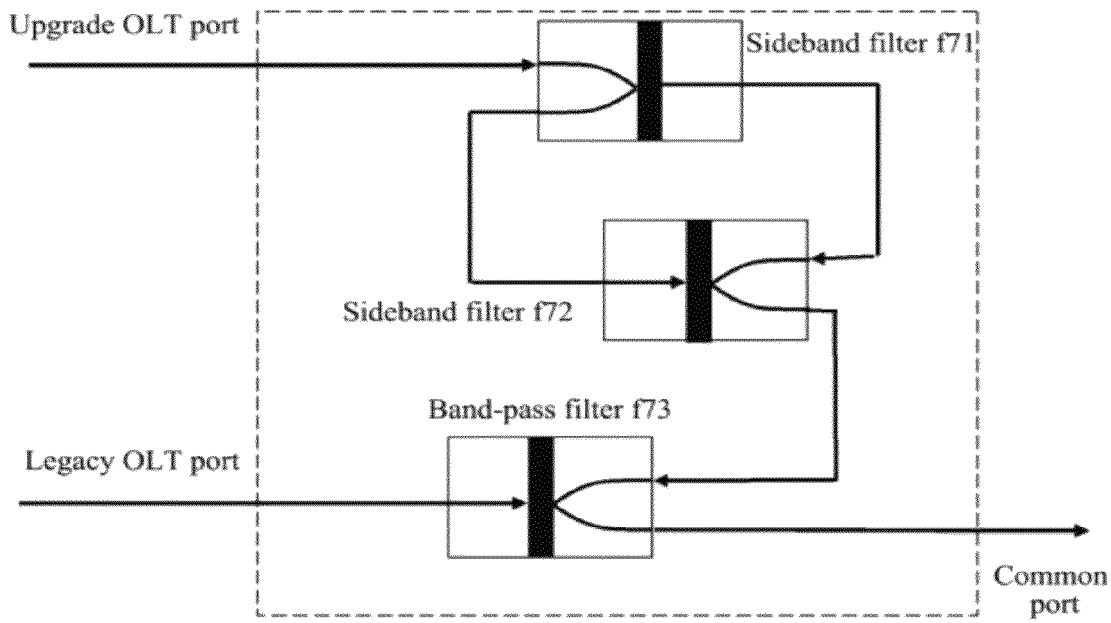
FIG. 8 (a) illustrates the structure of WDM1 in accordance with a seventh embodiment of the present invention.
Figure 8B:
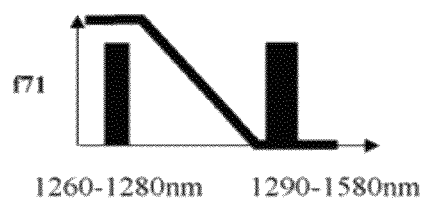
Figure 8C:
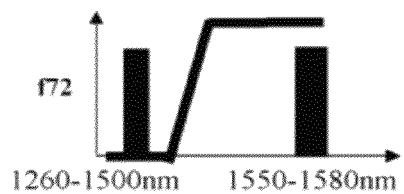
Figure 8D:
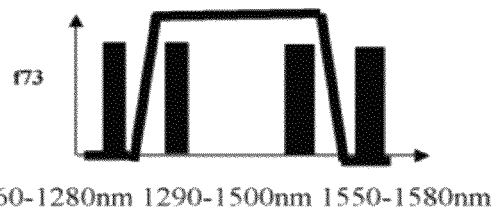
Figure 9A:
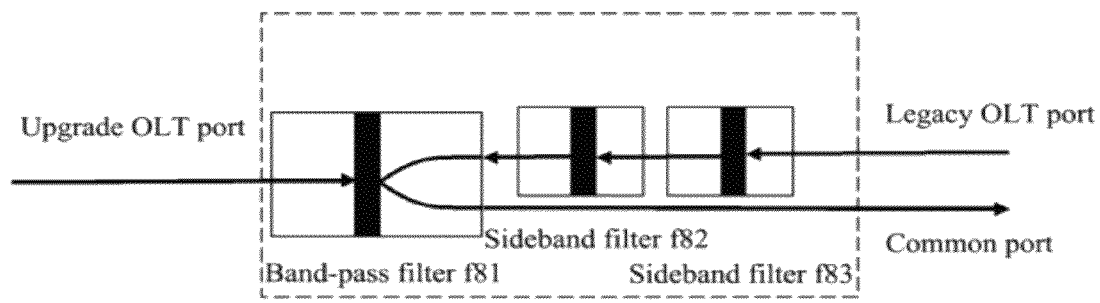
FIG. 9 (a) illustrates the structure of WDM1 in accordance with an eighth embodiment of the present invention.
Figure 9B:
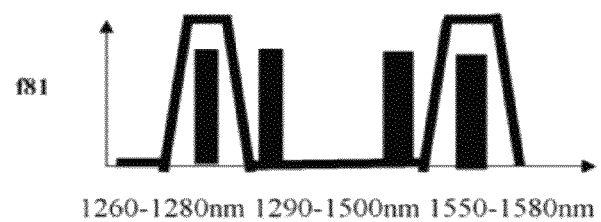
Figure 9C:
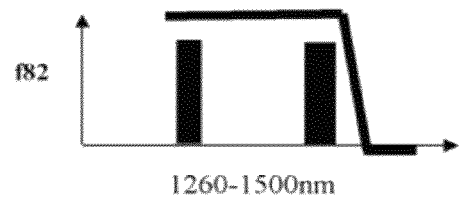
Figure 9D:
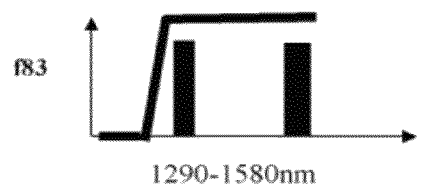
Figure 10A:
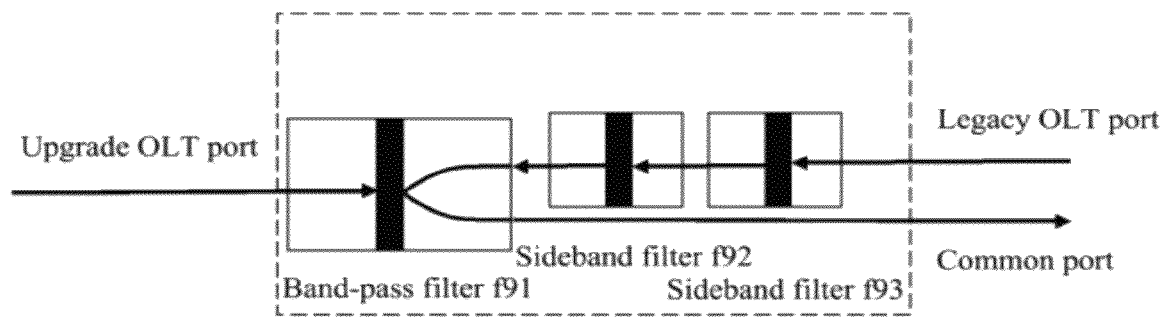
FIG. 10 (a) illustrates the structure of WDM1 in accordance with a ninth embodiment of the present invention.
Figure 10B:
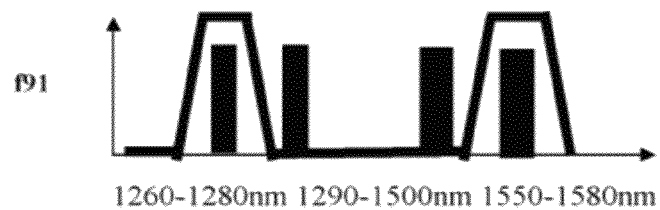
Figure 10C:
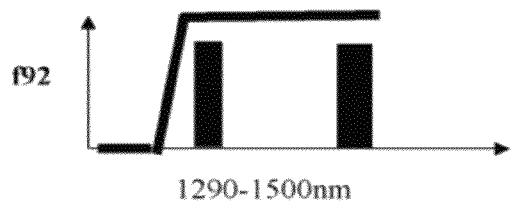
Figure 10D:
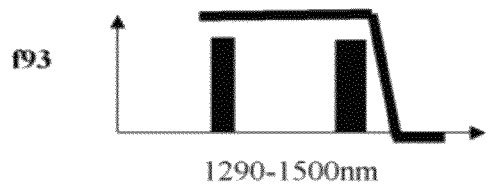
Figure 11A:
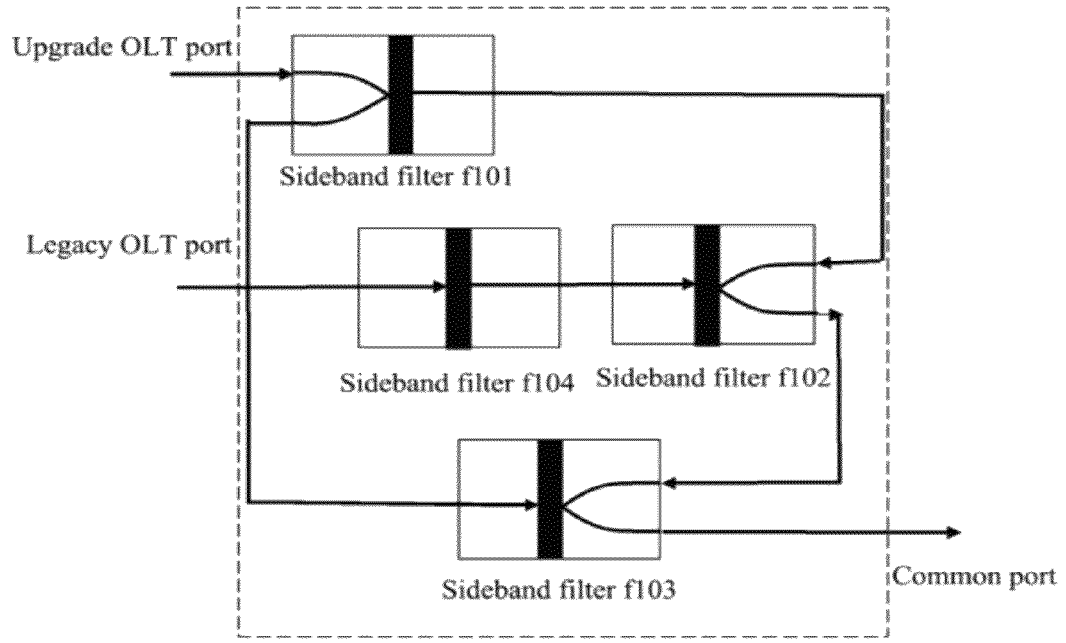
FIG. 11 (a) illustrates the structure of WDM1 in accordance with a tenth embodiment of the present invention.
Figure 11B:
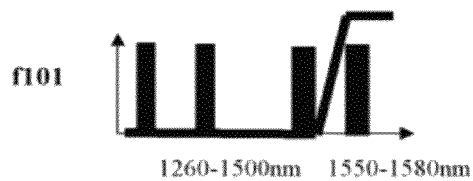
Figure 11C:
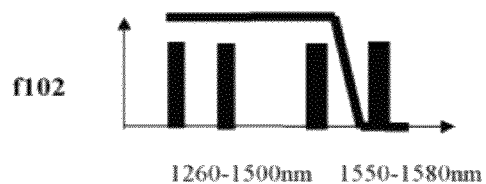
Figures 11D, 11E:
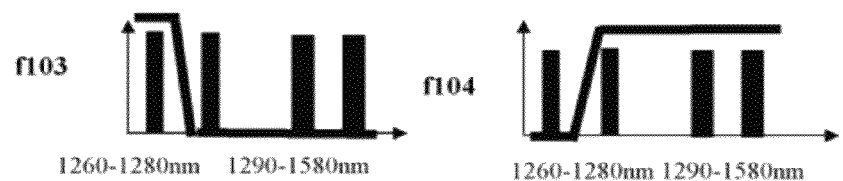
Figure 11F:
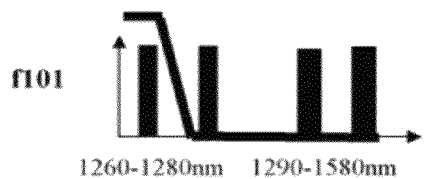
Figure 11G:
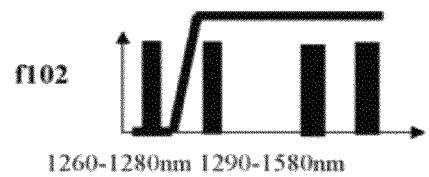
Figure 11H:
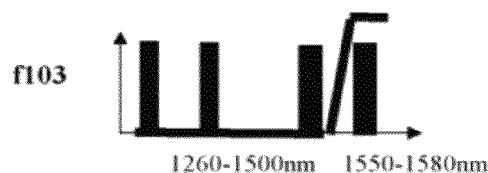
Figure 11I:
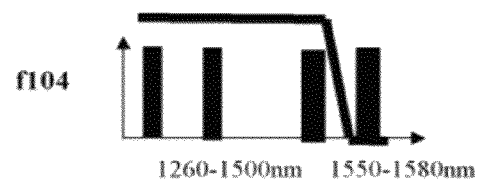
Figure 12A:
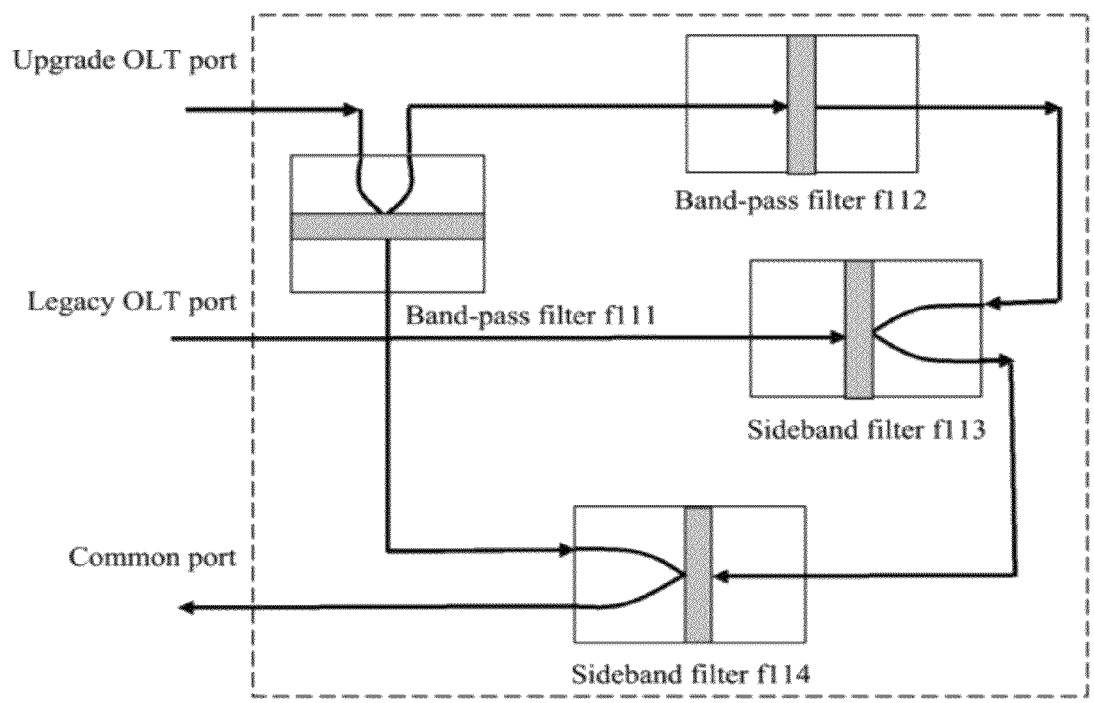
FIG. 12 (a) illustrates the structure of WDM1 in accordance with an eleventh embodiment of the present invention.
Figure 12B:
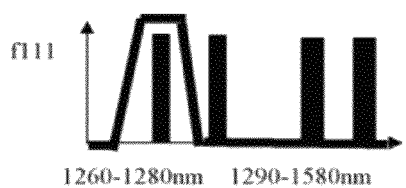
Figure 12C:
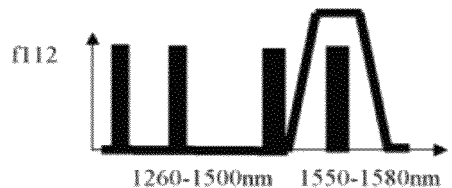
Figure 12D:
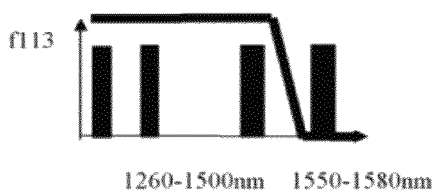
Figure 12E:
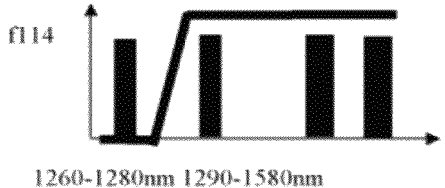

The structure of WDM1 in this embodiment is shown as FIG. 8(a), and the WDM1 comprises the sideband filter f71, the sideband filter f72 and the band-pass filter f73, the spectral properties of these three filters are shown respectively from FIG. 8 (b) to FIG. 8 (d). It can be seen that the structure of this embodiment is basically the same as that of the second embodiment, only exchanging the positions of sideband filters f51 and f51 in the second embodiment, while keeping their performances the same. Therefore, the detailed description of this embodiment will be omitted here.

The Eighth Embodiment

As shown in FIG. 9 (a), WDM1 in this embodiment comprises the band-pass filter f81, the sideband filter f82 and the sideband filter f83. The transmission band of f82 comprises 1260 nm~1500 nm, the reflection band of f82 comprises 1550 nm~1580 nm; the transmission band of f83 comprises 1290 nm~1580 nm, and the reflection band of f83 comprises 1260 nm~1280 nm.

The spectral property of f81 in this embodiment is the same as that of f61 in the sixth embodiment. The roles of the two serially connected sideband filters f82 and f83 are the same as that of f62, and the overlapped spectral property is the same as that of f62, although the sideband filters f82 and f83 are more easily implemented. Therefore, WDM1 in this embodiment can implement the multiplexing and de-multiplexing of the optical signals in the upgrade band and the basic band, and it also meets the above first isolation condition.

The Ninth Embodiment

The difference between this embodiment and the eighth embodiment is that the positions of the sideband filters f82 and f83 in the eighth embodiment are exchanged, and this embodiment will not be described in detail here.

The Tenth Embodiment

As shown in FIG. 11 (a), WDM1 in this embodiment comprises the sideband filters f101, f102, f103 and f104. As shown in FIG. 11 (b)~(e), the transmission band of the sideband filter f101 includes 1550 nm~1580 nm, the reflection band of the sideband filter f101 includes 1260 nm~1500 nm; the transmission band of the sideband filter f102 includes 1260 nm~1500 nm, and the reflection band of the sideband filter f102 includes 1550 nm~1580 nm; the transmission band of the sideband filter f103 includes 1260 nm~1280 nm, and the reflection band of the sideband filter f103 includes 1290 nm~1580 nm; the transmission band of the sideband filter f104 includes 1290 nm~1580 nm, and the reflection band of the sideband filter f104 includes 1260 nm~1280 nm.

There are optical channels between the upgrade OLT port of WDM1 and the common port of f101, between the reflection port of f101 and the transmission port of f103, between the transmission port of f101 and the reflection port of f102, between the transmission port of f102 and the transmission port of f104, between the common port of f102 and the reflection port of f103, between the common port of f103 and the common port of WDM1, and between the common port of f104 and the legacy OLT port of WDM1. The common port and the transmission port of f104 can be exchanged.

From FIG. 11 (a)~(e), it can be seen that WDM1 in this embodiment can implement the wavelength division multiplexing and de-multiplexing of the optical signals in the upgrade band and the basic band, and it also meets the above first isolation condition. All filters used in this embodiment are sideband filters and they have relatively low cost.

By changing the filter types and/or their spectral properties, the embodiment has some variations, for example:

Variation one: the structure of variation one is still as shown in FIG. 11 (a), the connection relationship among f101~f104 is unchanged, while the sideband filter f101 is modified to a band-pass filter with transmission band including 1550 nm~1580 nm and reflection band including 1260 nm~1500 nm, the sideband filter f103 is modified to a band-pass filter with transmission band including 1260 nm~1280 nm and reflection band including 1290 nm~1580 nm; while the sideband filters f102~f104 are unmodified. Obviously, the performance of the modified WDM1 is similar to its counterpart before the modification. Moreover, it is feasible to just modify one of f101 and f103 rather than both of them in this variation.

Variation two, the structure of variation two is still as shown in FIG. 11 (a), and the connection relationship among filters f101~f104 unchanged, the spectral properties of the sideband filters are modified to those shown in FIG. 11 (f)~(i) respectively, that is: the transmission band of the sideband filter f101 includes 1260 nm~1280 nm, and the reflection band of the sideband filter f101 includes 1290 nm~1580 nm; the transmission band of the sideband filter f102 includes 1290 nm~1580 nm, and the reflection band of the sideband filter f102 includes 1260 nm~1280 nm; the transmission band of the sideband filter f103 includes 1550 nm~1580 nm, and the reflection band of the sideband filter f103 includes 1260 nm~1500 nm; the transmission band of the sideband filter f104 includes 1260 nm~1500 nm, and the reflection band of the sideband filter f104 comprises 1550 nm~1580 nm. In this variation, WDM1 can also achieve the multiplexing and de-multiplexing of the optical signals in the upgrade and basic bands, and it still meets the above first isolation condition.

Variation three: on the basis of variation two, the sideband filter f101 is modified to a band-pass filter with transmission band including 1260 nm~1280 nm and reflection band including 1290 nm~1580 nm; and/or, the sideband filter f103 can be modified to a band-pass filter with transmission band including 1550 nm~1580 nm and reflection band including 1260 nm~1500 nm.

The Eleventh Embodiment

The structure of WDM1 in this embodiment is as shown in FIG. 12 (a), and WDM1 comprises the band-pass filter f111, the band-pass filter f112, the sideband filter f113 and the sideband filter f114. Their spectral properties are respectively shown in FIG. 12 (b)~12 (e), the transmission band of the band-pass filter f111 includes 1260 nm~1280 nm, and the reflection band of the band-pass filter f111 includes 1290 nm~1580 nm; the transmission band of the band-pass filter f112 comprises 1550 nm~1580 nm, and the reflection band of the band-pass filter f112 includes 1260 nm~1500 nm; the transmission band of the sideband filter f113 includes 1260 nm~1500 nm, and the reflection band of the sideband filter f113 includes 1550 nm~1580 nm; the transmission band of the sideband filter f114 includes 1290 nm~1580 nm, and the reflection band of the sideband filter f114 includes 1260 nm~1280 nm.

In the aspect of the connection relationship, there are optical channels between the upgrade OLT port of WDM1 and the common port of the band-pass filter f111, between the transmission port of f111 and the reflection port of f114, between the reflection port of f111 and the transmission port (or the common port) of f112, between the common port (or transmission port) of f112 and the reflection port of f113, between the transmission port of f113 and the legacy OLT port, between the common port of f113 and the transmission port of f114, and between the common port of f114 and the common port of WDM1.

By modifying the types of the filters and/or the filters' spectral properties, this embodiment also has some variations, for example:

Variation one: the connection relationship among f111~f114 is still as shown in FIG. 12 (a), while the band-pass filter f111 is modified to an sideband filter with transmission band including 1260 nm~1280 nm and reflection band including 1290 nm~1580 nm; and/or the band-pass filter f112 is modified to an sideband filter with transmission band including 1550 nm~1580 nm and reflection band including 1260 nm~1500 nm. The types and spectral properties of the sideband filters f113 and f114 are unmodified.

Variation two: the connection relationship among f111~f114 is still as shown in FIG. 12 (a), f111 is still a band-pass filter, however, its transmission band includes 1550 nm~1580 nm, and its reflection band includes 1260 nm~1500 nm; f112 is still a band-pass filter, but its transmission band includes 1260 nm~1280 nm, and its reflection band includes 1290 nm~1580 nm; f113 is still a band-pass filter, but its transmission band includes 1290 nm~1580 nm, and its reflection band includes 1260 nm~1280 nm; f114 is still an sideband filter, but its transmission band includes 1260 nm~1500 nm, and its reflection band includes 1550 nm~1580 nm.

Variation three: on the basis of variation two, the band-pass filters f111 and/or f112 are modified to sideband filters, and the transmission or reflection relationship of the related four bands in the spectral properties of the modified sideband filters f111 and f112 is the same as that of f111 and f112 in variation two.

Analyzing the connection relationship and the spectral property of each filter in the eleventh embodiment and its three variations, it can be seen that WDM1 in this embodiment and all variations can achieve the multiplexing and de-multiplexing of the optical signals in the upgrade and basic bands, and it meets the above first isolation condition.

Although various embodiments with different structures are illustrated above, those skilled in this field can understand that there may be a lot of other combinations, as long as these combinations can achieve the wavelength division multiplexing and de-multiplexing and meet the isolation requirement, they can be used for WDM1 of the present invention.

Figure 13:
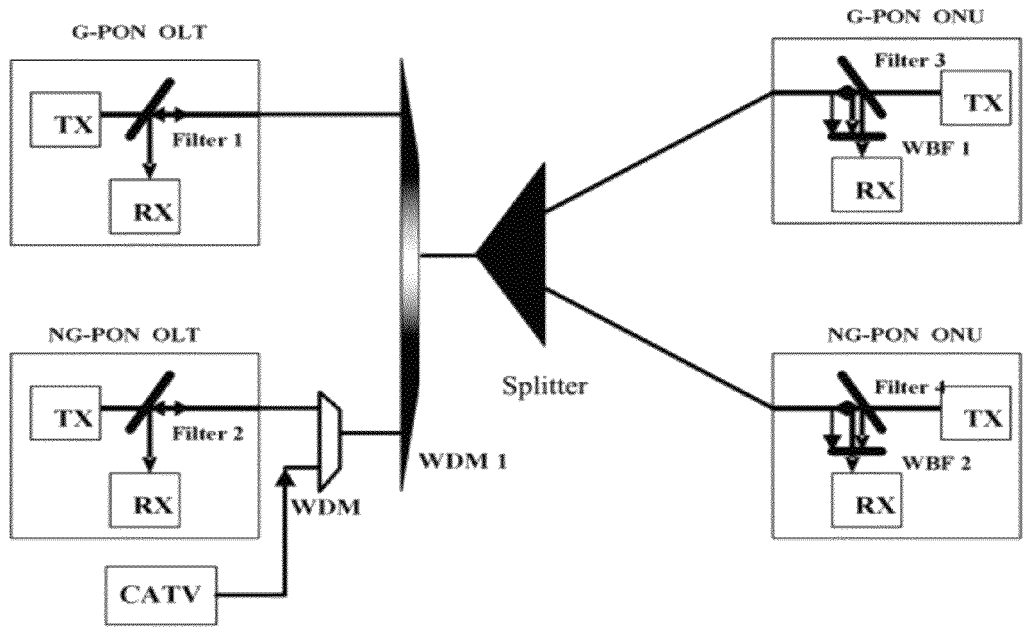
FIG. 13 is a diagram of the network structure of WDM1 implementing the compatibility of the NG-PON with the G-PON in accordance with an embodiment of the present invention.

In the following, the G-PON will be taken as an example to describe the structure of NG-PON compatible with the TDM-PON with the wavelength division multiplexer provided in the embodiments of the present invention, as shown FIG. 13.

The network structure of said NG-PON compatible with the G-PON comprises the G-PON system network architecture based on the basic band and the NG-PON system network architecture based on the upgrade band, wherein, the G-PON system network architecture comprises the G-PON OLT, the WDM1, the splitter and the G-PON ONU; the NG-PON system network architecture comprises the NG-PON OLT, the CATV, the WDM1, the splitter and the NG-PON ONU, wherein, the WDM1 should be introduced to smoothly upgrade the TDM-PON to the NG-PON, and the network compatibility is achieved via the multiplexing and de-multiplexing.

For the G-PON system, in the downstream direction, the optical signal whose the central wavelength of downstream wavelength is 1490 nm±10 nm, is transmitted by the Tx optical module at the G-PON OLT side, and the signal is through Filter 1, and then input via the legacy OLT port of WDM1, and multiplexed and output by the common port of WDM1 through the splitter, and sent to the G-PON ONU, filtered by Filter 3 in the G-PON ONU which matches with the signal, and finally received by Rx; vice versa in the upstream direction;

For the NG-PON system, in the downstream direction, the optical signal, whose downstream wavelength is 1575 nm~1580 nm, is transmitted by the Tx optical module at the NG-PON OLT side, the signal is through Filter 2, and combined with a CATV downstream signal whose wavelength is 1550 nm~1560 nm via a WDM device, and the combined signal (including the downstream signal (whose wavelength is 1575 nm~1580 nm) in the NG-PON and the downstream signal (1550 nm~1560 nm) in CATV) is input via the upgrade OLT port of WDM1, and then multiplexed and output by the common port of WDM1, and then sent to the NG-PON ONU via the splitter, filtered by Filter 4 in the NG-PON ONU which matches with it, and then received by the Rx. Vice versa in the upstream direction, thus the case in the upstream direction will not be described here.

Therefore, for the layout of the G-PON network and the smooth upgrade of the existing G-PON network, in order to significantly save the existing ODN network resource, WDM1 must be introduced to achieve the compatibility of G-PON and NG-PON via the multiplexing/de-multiplexing function.

The above description is only the preferred embodiments of the present invention, and the protection scope of the present invention is not limited thereto. Any modification and alternative that is easy to be thought out within the technical scheme disclosed by the present invention by the persons having ordinary skill in the art shall all fall into the protection scope of the present invention. Therefore, the protection scope of the present invention should be subject to the protection scope of the claims.

INDUSTRIAL APPLICABILITY

WDM1 provided by the present invention implements the wavelength division multiplexing and de-multiplexing of the optical signals in the basic and upgrade bands. It makes the ODN in the existing TDM-PON can transport the NG-PON at the same time, so as to smoothly upgrade the existing TDM-PON to the NG-PON and provide subsequent network compatibility to the deployed TDM-PON system. In some embodiments, relatively low cost can still meet the high isolation requirement of the optical signal in working band by reasonably using the thin film filters and selecting the spectral properties of the filters, moreover, the requirements for the isolation and the optical network insert loss can be overall taken into account by setting the number of filters and their spectral properties. A simple but practical technology applied in the embodiment of the present invention implements WDM1 with low lost and high reliability; moreover, the system is easy to use and upgrade.

What is claimed is:

1. A wavelength division multiplexer compatible with two passive optical networks, comprising an upgrade optical line terminal port, a legacy optical line terminal port, a common port, and one or more filters, wherein, said one or more filters are configured: in a downstream direction, to multiplex an optical signal in a basic band input from the legacy optical line terminal port and an optical signal in an upgrade band input from the upgrade optical line terminal port, and to output the multiplexed optical signal via the common port; in an upstream direction, to de-multiplex a wavelength division multiplexed optical signal input from the common port into the optical signal in the basic band and that in the upgrade band respectively, and to output the optical signal in the basic band via the legacy optical line terminal port and the optical signal in the upgrade band via the upgrade optical line terminal port;

both said basic band and upgrade band comprise the downstream band transmitted in the downstream direction and the upstream band transmitted in the upstream direction, and the downstream band and the upstream band of said upgrade band are different;

therefore, compatibility of a next generation passive optical network which uses the upgrade band and an existing time division multiplexing passive optical network which uses the basic band can be achieved;

wherein, said wavelength division multiplexer comprises a plurality of filters, and said filters are configured as that:

there is at least one filter among said a plurality of filters whose transmission band comprises the upstream band in the basic band and reflection band comprises the upstream band in the upgrade band in an upstream optical channel from a filter de-multiplexing optical signals in the upstream band in the basic band and in the upstream band in the upgrade band to the legacy optical line terminal port;

there is at least one filter among said a plurality of filters whose transmission band comprises the upstream band in the upgrade band and the reflection band comprises the upstream band in the basic band in an upstream optical channel from the filter de-multiplexing optical signals in the upstream band in the basic band and in the upstream band in the upgrade band to the upgrade optical line terminal port;

there is at least one filter among said a plurality of filters whose transmission band comprises the downstream band in the basic band and reflection band comprises a downstream band in the upgrade band in a downstream optical channel from the legacy optical line terminal port to a filter multiplexing optical signals in the downstream band in the basic band and the downstream band in the upgrade band; and there is at least one filter among said a plurality of filters whose transmission band comprises the downstream band in the upgrade band and reflection band comprises the downstream band in the basic band in a downstream optical channel from the upgrade optical line terminal port to the filter multiplexing optical signals in the downstream band in the basic band and the downstream band in the upgrade band.

2. A wavelength division multiplexer of claim 1, wherein any of said a plurality of filters comprises a transmission port, a reflection port and a common port, or comprises a transmission port and a common port, said reflection port and common port being at one side of said filter, while said transmission port being at the other side other than the side in which said reflection port and common port locate;

said wavelength division multiplexer comprises a first filter, a second filter, a third filter and a fourth filter, and is configured as that: there are optical channels between the upgrade optical line terminal port and the common port of the first filter, between the reflection port of the first filter and the transmission port or the common port of the fourth filter, between the common port or the transmission port of the fourth filter and the reflection port of the third filter, between the transmission port of the first filter and the reflection port of the second filter, between the legacy optical line terminal port and the transmission port of the second filter, between the common port of the second filter and the transmission port of the third filter, and between the common port of said wavelength division multiplexer and the common port of the third filter.

3. A wavelength division multiplexer of claim 2, wherein, said first filter is a band-pass or sideband filter, and the transmission band of said first filter comprises the downstream band in the upgrade band and the reflection band of said first filter comprises the basic band and the upstream band in the upgrade band; said second filter is a sideband filter, and the transmission band of the second filter comprises the basic band and the upstream band in the upgrade band, and the reflection band of said second filter comprises the downstream band in the upgrade band; said third filter is a sideband filter, and the transmission band of said third filter comprises the downstream band in the upgrade band and the basic band, and the reflection band of said third filter comprises the upstream band in the upgrade band; said fourth filter is a band-pass or sideband filter, and the transmission band of the fourth filter comprises the upstream band in the upgrade band, and the reflection band of the fourth filter comprises the downstream band in the upgrade band and the basic band; alternatively said first filter is a band-pass or sideband filter, and the transmission band of said first filter comprises the upstream band in the upgrade band, the reflection band of said first filter comprises the downstream band in the upgrade band and the basic band; said second filter is a sideband filter, and the transmission band of said second filter comprises the downstream band in the upgrade band and the basic band, the reflection band of said second filter comprises the upstream band in the upgrade band; said third filter is a sideband filter, and the transmission band of the third filter comprises the upstream band in the upgrade band and the basic band, the reflection band of the third filter comprises the downstream band in the upgrade band; said fourth filter is a band-pass or sideband filter, and the transmission band of the fourth filter comprises the downstream band in the upgrade band, the reflection band of the fourth filter comprises the basic band and the upstream band in the upgrade band.

4. A wavelength division multiplexer of claim 3, wherein, the filters in said wavelength division multiplexer are thin film filters, and the upstream band in said upgrade band is 1260 nm~1280 nm, and the downstream band in said upgrade band is 1550 nm~1580 nm; the upstream band in said basic band is 1290 nm~1330 nm, that is, a O band, and the downstream band in said basic band is 1480 nm~1500 nm, that is, a S band.

5. A wavelength division multiplexer of claim 2, wherein, the filters in said wavelength division multiplexer are thin film filters, and the upstream band in said upgrade band is 1260 nm~1280 nm, and the downstream band in said upgrade band is 1550 nm~1580 nm; the upstream band in said basic band is 1290 nm~1330 nm, that is, a O band, and the downstream band in said basic band is 1480 nm~1500 nm, that is, a S band.

6. A wavelength division multiplexer of claim 1, wherein, any of said a plurality of filters comprises a transmission port, a reflection port and a common port, or comprises a transmission port and a common port, said reflection port and common port are at one side of said filter, while said transmission port being at the other side other than the side in which said reflection port and common port locate;

said wavelength division multiplexer comprises a first filter, a second filter, a third filter and a fourth filter, and the wavelength division multiplexer is configured as that: there are optical channels between the upgrade optical line terminal port and the common port of the first filter, between the reflection port of the first filter and the transmission port of the third filter, between the transmission port of the first filter and the reflection port of the second filter, between the transmission port of the second filter and the transmission port or the common port of the fourth filter, between the common port of the second filter and the reflection port of the third filter, between the common port of the third filter and the common port of said wavelength division multiplexer, and between the common port or the transmission port of said fourth filter and the legacy optical line terminal port.

7. A wavelength division multiplexer of claim 6, wherein, said first filter is a band-pass or sideband filter, and the transmission band of the first filter comprises the downstream band in the upgrade band, the reflection band of the first filter comprises the upstream band in the upgrade band and the basic band; said second filter is a sideband filter, and the transmission band of said second filter comprises the upstream band of the upgrade band and the basic band, the reflection band of said second filter comprises the downstream band in the upgrade band; said third filter is a band-pass or sideband filter, and the transmission band of the third filter comprises the upstream band in the upgrade band, the reflection band of the third filter comprises the downstream band in the upgrade band and the basic band; said fourth filter is a sideband filter, and the transmission band of the fourth filter comprises the downstream band in the upgrade band and the basic band, the reflection band of the fourth filter comprises the upstream band in the upgrade band; alternatively said first filter is a band-pass or sideband filter, and the transmission band of the first filter comprises the upstream band in the upgrade band, the reflection band of the first filter comprises the downstream band in the upgrade band and the basic band; said second filter is a sideband filter, and the transmission band of the second filter comprises the downstream band in the upgrade band and the basic band, the reflection band of the second filter comprises the upstream band in the upgrade band; said third filter is a band-pass or sideband filter, and the transmission band of the third filter comprises the downstream band in the upgrade band, the reflection band of the third filter comprises the upstream band in the upgrade band and the basic band; said fourth filter is a sideband filter, and the transmission band of the fourth filter comprises the upstream band in the upgrade band and the basic band, the reflection band of the fourth filter comprises the downstream band in the upgrade band.

8. A wavelength division multiplexer of claim 7, wherein, the filters in said wavelength division multiplexer are thin film filters, and the upstream band in said upgrade band is 1260 nm~1280 nm, and the downstream band in said upgrade band is 1550 nm~1580 nm; the upstream band in said basic band is 1290 nm~1330 nm, that is, a O band, and the downstream band in said basic band is 1480 nm~1500 nm, that is, a S band.

9. A wavelength division multiplexer of claim 6, wherein, the filters in said wavelength division multiplexer are thin film filters, and the upstream band in said upgrade band is 1260 nm~1280 nm, and the downstream band in said upgrade band is 1550 nm~1580 nm; the upstream band in said basic band is 1290 nm~1330 nm, that is, a O band, and the downstream band in said basic band is 1480 nm~1500 nm, that is, a S band.

10. A wavelength division multiplexer of claim 1, wherein, any of said a plurality of filters comprises a transmission port, a reflection port and a common port, or comprises a transmission port and a common port, said reflection port and common port being at one side of said filter, while said transmission port being at the other side other than the side in which said reflection port and common port locate;

said wavelength division multiplexer comprises a first filter, a second filter, a third filter and a fourth filter, and is configured as that: there are optical channels between the upgrade optical line terminal port and the common port of the first filter, between the reflection port of the first filter and the transmission port or the common port of the second filter, between the transmission port of the first filter and the reflection port of the fourth filter, between the common port or the transmission port of the second filter and the reflection port of the third filter, between the common port of the third filter and the transmission port of the fourth filter, between the transmission port of the third filter and the legacy optical line terminal port, and between the common port of the fourth filter and the common port of said wavelength division multiplexer.

11. A wavelength division multiplexer of claim 10, wherein,
said first filter is a band-pass or sideband filter, and the transmission band of the first filter comprises the upstream band in the upgrade band, the reflection band of the first filter comprises the downstream band in the upgrade band and the basic band; said second filter is a band-pass or sideband filter, and the transmission band of the second filter comprises the downstream band in the upgrade band, the reflection band of the second filter comprises the upstream band in the upgrade band and the basic band; said third filter is a band-pass or sideband filter, and the transmission band of the third filter comprises the upstream band in the upgrade band and the basic band, the reflection band of the third filter comprises the downstream band in the upgrade band; said fourth filter is a sideband filter, and the transmission band of the fourth filter comprises the downstream band in the upgrade band and the basic band, the reflection band of the fourth filter comprises the upstream band in the upgrade band; alternatively
said first filter is a band-pass or sideband filter, and the transmission band of the first filter comprises the downstream band in the upgrade band, the reflection band of the first filter comprises the upstream band in the upgrade band and the basic band; said second filter is a band-pass or sideband filter, and the transmission band of the second filter comprises the upstream band in the upgrade band, the reflection band of the second filter comprises the downstream band in the upgrade band and the basic band; said third filter is an sideband filter, and the transmission band of the third filter comprises the downstream band in the upgrade band and the basic band, the reflection band of the third filter comprises the upstream band in the upgrade band; said fourth filter is a sideband filter, and the transmission band of the fourth filter comprises the upstream band in the upgrade band and the basic band, the reflection band of the fourth filter comprises the downstream band in the upgrade band.

12. A wavelength division multiplexer of claim 11, wherein, the filters in said wavelength division multiplexer are thin film filters, and the upstream band in said upgrade band is 1260 nm~1280 nm, and the downstream band in said upgrade band is 1550 nm~1580 nm; the upstream band in said basic band is 1290 nm~1330 nm, that is, a O band, and the downstream band in said basic band is 1480 nm~1500 nm, that is, a S band.

13. A wavelength division multiplexer of claim 10, wherein, the filters in said wavelength division multiplexer are thin film filters, and the upstream band in said upgrade band is 1260 nm~1280 nm, and the downstream band in said upgrade band is 1550 nm~1580 nm; the upstream band in said basic band is 1290 nm~1330 nm, that is, a O band, and the downstream band in said basic band is 1480 nm~1500 nm, that is, a S band.

14. A wavelength division multiplexer of claim 1, wherein, said wavelength division multiplexer comprises a filter, and said filter is a band-pass filter, and there are optical channels between a transmission port of the band-pass filter and the legacy optical line terminal port, between a common port of the band-pass filter and the common port of said wavelength division multiplexer, and between a reflection port of the band-pass filter and the upgrade optical line terminal port; and a transmission band of the band-pass filter comprises the basic band, and a reflection band of the band-pass filter comprises the upgrade band; alternatively
there are optical channels between the transmission port of the band-pass filter and the upgrade optical line terminal port, between the common port of the filter and the common port of said wavelength division multiplexer, and between the reflection port of the filter and the legacy optical line terminal port, and the transmission band of the band-pass filter comprises the upgrade band and the reflection band of the band-pass filter comprises the basic band.

15. A wavelength division multiplexer of claim 14, wherein, the filters in said wavelength division multiplexer are thin film filters, and the upstream band in said upgrade band is 1260 nm~1280 nm, and the downstream band in said upgrade band is 1550 nm~1580 nm; the upstream band in said basic band is 1290 nm~1330 nm, that is, a O band, and the downstream band in said basic band is 1480 nm~1500 nm, that is, a S band.

16. A wavelength division multiplexer of claim 1, wherein, composition of a plurality of filters of the wavelength division multiplexer and spectral properties of the filters are in one of the following modes:
mode 1: said wavelength division multiplexer comprises a first filter, a second filter and a third filter, the transmission band of the first filter comprises the downstream band in the upgrade band, and the reflection band of the first filter comprises the upstream band in the upgrade band and the basic band; the transmission band of the second filter comprises the upstream band in the upgrade band, and the reflection band of the second filter comprises the downstream band in the upgrade band and the basic band; the transmission band of the third filter comprises the basic band, and the reflection band of the third filter comprises the upgrade band; in connection, there are optical channels between the upgrade optical line terminal port and a common port of the first filter, between a reflection port of the first filter and a transmission port of the second filter, between a transmission port of the first filter and a reflection port of the second filter, between a common port of the second filter and a reflection port of the third filter, between a transmission port of the third filter and the legacy optical line terminal port, and between a common port of the third filter and a common port of said wavelength division multiplexer;
mode 2: positions of the first filter and the second filter in mode 1 are exchanged, and the spectral property of each filter is the same as that in mode 1;
mode 3: said wavelength division multiplexer comprises a fifth filter and a sixth filter, a transmission band of the fifth filter comprises the basic band and a reflection band of the fifth filter comprises the upgrade band; a transmission band of the sixth filter comprises the upgrade band and the reflection band of the sixth filter comprises the basic band; in connection, there are optical channels between the legacy optical line terminal port and the transmission port of the fifth filter, between a common port of the wavelength division multiplexer and a common port of the fifth filter, between the upgrade optical line terminal port and a transmission port or a common port of the sixth filter, and between the common port or the transmission port of the sixth filter and a reflection port of the fifth filter;

mode 4, said wavelength division multiplexer comprises a seventh filter and a eighth filter, a transmission band of the seventh filter comprises the upgrade band and a reflection band of the seventh filter comprises the basic band; a transmission band of the eighth filter comprises the basic band and a reflection band of the eighth filter comprises the upgrade band; in connection, there are optical channels between a transmission port of the seventh filter and the upgrade optical line terminal port, between a reflection port of the seventh filter and a transmission port or a common port of the eighth filter, between a common port of the seventh filter and a common port of said wavelength division multiplexer, and between the common port or the transmission port of the eighth filter and the legacy optical line terminal port;

mode 5: said wavelength division multiplexer comprises a ninth filter, a tenth filter and an eleventh filter, a transmission band of the ninth filter comprises the upgrade band and a reflection band of the ninth filter comprises the basic band; a transmission band of the tenth filter comprises the upstream band in the upgrade band and the basic band and a reflection band of the tenth filter comprises the downstream band in the upgrade band; a transmission band of the eleventh filter comprises the downstream band in the upgrade band and the basic band and a reflection band of the eleventh filter comprises the upstream band in the upgrade band; in connection, there are optical channels between a transmission port of the ninth filter and the upgrade optical line terminal port, between a common port of the ninth filter and a common port of said wavelength division multiplexer, between a reflection port of the ninth filter and a common port or a transmission port of the tenth filter, between the transmission port or the common port of the tenth filter and the common port or the transmission port of the ninth filter, and between the transmission port or the common port of the ninth filter and the legacy optical line terminal port;

mode 6: positions of the tenth filter and the eleventh filter in mode 5 are exchanged, and the spectral property of each filter is the same as that in mode 5.

17. A wavelength division multiplexer of claim 16, wherein, the filters in said wavelength division multiplexer are thin film filters, and the upstream band in said upgrade band is 1260 nm~1280 nm, and the downstream band in said upgrade band is 1550 nm~1580 nm; the upstream band in said basic band is 1290 nm~1330 nm, that is, a O band, and the downstream band in said basic band is 1480 nm~1500 nm, that is, a S band.

18. A wavelength division multiplexer of claim 1, wherein, the filters in said wavelength division multiplexer are thin film filters, and the upstream band in said upgrade band is 1260 nm~1280 nm, and the downstream band in said upgrade band is 1550 nm~1580 nm; the upstream band in said basic band is 1290 nm~1330 nm, that is, a O band, and the downstream band in said basic band is 1480 nm~1500 nm, that is, a S band.

* * * * *